US011113841B1

(12) United States Patent
Zelenskiy et al.

(10) Patent No.: US 11,113,841 B1
(45) Date of Patent: Sep. 7, 2021

(54) SELF-LEARNING THREE-DIMENSIONAL BOUNDARIES FROM IMAGES

(71) Applicant: Amazon Technologies, Inc., Seattle, WA (US)

(72) Inventors: Lev Zelenskiy, South Brisbane (AU); Jon Ducrou, West End (AU); James Eather, Kelvin Grove (AU); Michael Neville, Bunya (AU)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 16/438,028

(22) Filed: Jun. 11, 2019

(51) Int. Cl.
| | |
|---|---|
| *G06T 7/00* | (2017.01) |
| *G06T 7/73* | (2017.01) |
| *H04N 5/247* | (2006.01) |
| *G06K 9/00* | (2006.01) |
| *G06Q 10/08* | (2012.01) |

(52) U.S. Cl.
CPC ............ *G06T 7/74* (2017.01); *G06K 9/00771* (2013.01); *G06Q 10/0835* (2013.01); *H04N 5/247* (2013.01); *G06K 2209/15* (2013.01); *G06K 2209/23* (2013.01); *G06T 2207/20164* (2013.01); *G06T 2207/30252* (2013.01); *G06T 2207/30264* (2013.01)

(58) Field of Classification Search
CPC ............ G06T 7/74; G06T 2207/20164; G06T 2207/30252; G06T 2207/30264; G06K 9/00771; G06K 2209/15; G06K 2209/23; G06Q 10/0835; H04N 5/247
See application file for complete search history.

(56) References Cited

U.S. PATENT DOCUMENTS

| | | | | |
|---|---|---|---|---|
| 10,991,249 | B2 * | 4/2021 | Reisbick | G06K 9/00771 |
| 2012/0299749 | A1 * | 11/2012 | Xiao | G08G 1/148 |
| | | | | 340/932.2 |
| 2013/0147954 | A1 * | 6/2013 | Song | G08G 1/04 |
| | | | | 348/148 |
| 2020/0175634 | A1 * | 6/2020 | Aggarwala | G06Q 50/30 |
| 2020/0175868 | A1 * | 6/2020 | Reisbick | G08G 1/142 |

FOREIGN PATENT DOCUMENTS

| | | | | | |
|---|---|---|---|---|---|
| CN | 204129967 | U | * | 1/2015 | |
| CN | 105809972 | A | * | 7/2016 | |
| GB | 2535926 | A | * | 8/2016 | ......... G06K 9/00624 |

* cited by examiner

*Primary Examiner* — Dave Czekaj
*Assistant Examiner* — Shanika M Brumfield
(74) *Attorney, Agent, or Firm* — Kilpatrick Townsend & Stockton LLP

(57) ABSTRACT

Techniques are disclosed. The techniques include receiving, from a camera, an image showing a portion of a physical topography and target object. The techniques include determining, based on the image, a location of the target object shown in the image and a physical characteristic of the target object shown in the image, the physical characteristic being common with at least another target object. The techniques then include determining a three dimensional (3D) position of the target object in a 3D representation of the portion of the physical topography, the 3D position determined based on (i) the location of the target object, and (ii) the physical characteristic. Based on detecting a cluster of 3D positions of target objects (over several images), the techniques involve generating a 3D boundary of a zone of a portion of the physical topography.

20 Claims, 11 Drawing Sheets

SELF-LEARNING THREE-DIMENSIONAL BOUNDARIES FROM IMAGES

BACKGROUND

Parking spaces of a parking lot are used to park vehicles. Systems and methods exist for creating a map of parking spaces. The map can be used to direct vehicles into parking spaces. These systems commonly use radio frequency (RF) signals to create the map. In many cases, these systems require complex steps to configure and maintain. For example, a Wi-Fi positioning system rely on multiple positioned wireless access points to determine where a device is located. Each access point may measure the intensity of the received signal from the device to determine a relative position of the device. However, signal fluctuations may occur which may increase inaccuracies.

BRIEF DESCRIPTION OF THE DRAWINGS

Various embodiments in accordance with the present disclosure will be described with reference to the drawings, in which.

DETAILED DESCRIPTION

Figure 1:
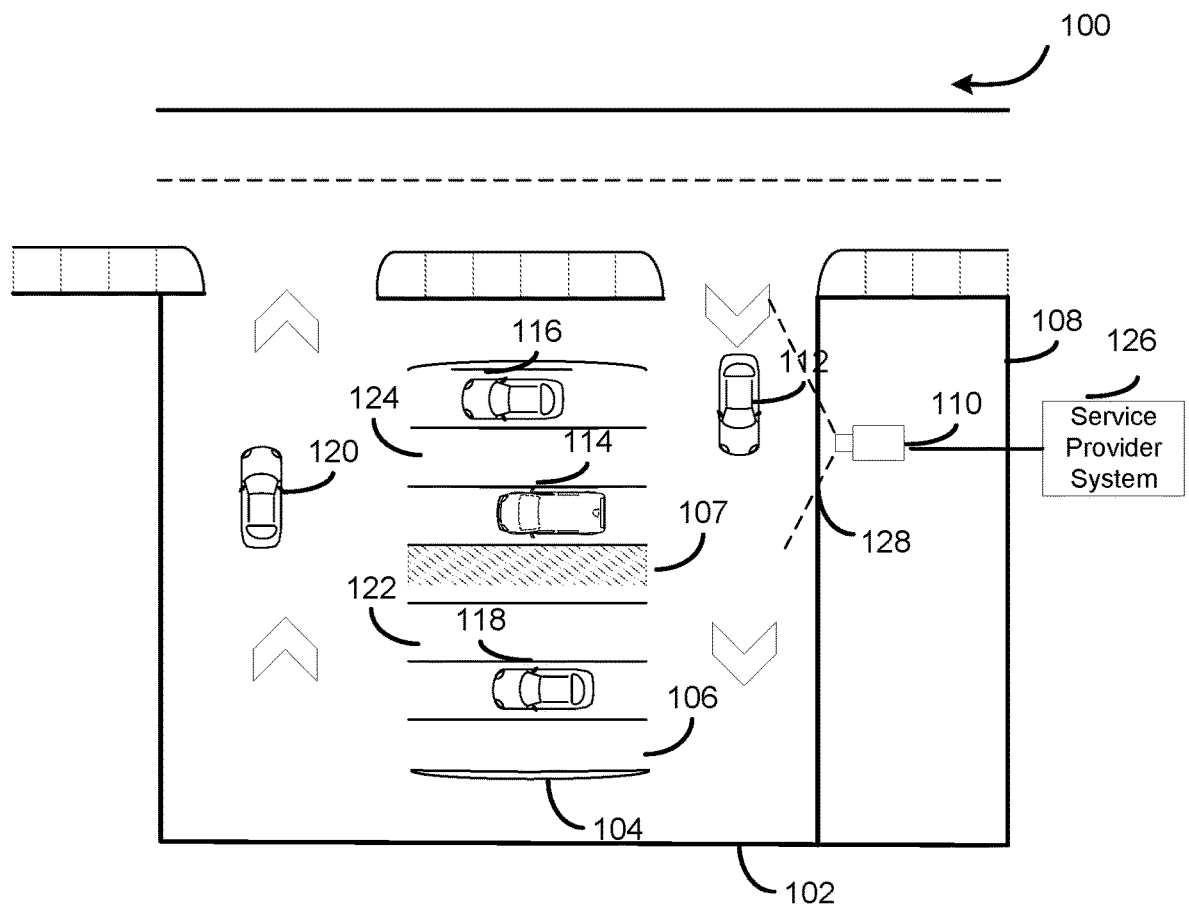
FIG. 1 illustrates a top-down view of an example location site under camera surveillance, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system and method for generating a three-dimensional (3D) representation of a physical topography and for generating a 3D boundary of a zone of the physical topography based on image data. The method may include at least two phases, including: (1) a first phase for generating the 3D representation of the physical topography, and (2) a second phase for generating the 3D boundary of the zone based on the previously generated 3D representation. Once the two phases are complete, the system may track when a target object has entered the zone of the physical topography.

Both phases involve detecting a target object with a known physical characteristic within an image taken by a camera of the system, the physical characteristic being common with other target objects. In the first phase, a plurality of images may be received by the system, the plurality of images representing a motion of the target object through a portion of the physical topography. Based on determining the location of the target object in each of the sequence of images and the common physical characteristic, the system may generate a 3D representation of the portion of the physical topography that is within the camera's field of view. In the second phase, the system may receive a second plurality of images from the same camera used in phase one (e.g., same field of view). The system may determine a 3D position in the 3D representation (e.g., generated in phase one) of a target object that is shown in each image of the second plurality of images, and thereby determine a cluster of 3D positions of target objects. Based on determining the cluster of 3D positions of target objects, the system may generate a 3D boundary of a zone of the portion of the physical topography that is within the camera's field of view.

By way of illustrative example, consider a scenario of using a parking lot at a pick-up location to provide deliveries to vehicles. In this scenario, the physical topography may correspond to a parking lot of the pick-up location, and a zone of the physical topography may correspond to a parking space of the parking lot. The user may typically drive to and park a vehicle in a parking space within the parking lot in front of the pick-up location. The parking lot may contain a number of parking spaces. The vehicle may have a license plate (e.g., target object) that is connected (e.g., affixed) to the vehicle. The license plate may have a common physical characteristic with other license plates (e.g., a known fixed distance between one corner and another corner of the license plate). A single standard camera that is communicatively coupled with the system may be mounted such that its field of view comprises a plurality of parking spaces of the parking lot. In some embodiments, the field of view of the camera may capture only a portion of the parking spaces of the parking lot. In some embodiments, multiple cameras may be mounted to monitor the parking lot, and sometimes the cameras may have overlapping fields of view. The camera may be configured to capture images of the plurality of parking spaces upon the occurrence of some event (e.g., detecting motion, predetermined time interval, etc.). For example, in some embodiments, the camera may capture an image of the vehicle arriving at the parking lot or leaving the parking lot. In other embodiments, the camera may capture the user's vehicle parked in a parking space. As discussed further below, embodiments of the present disclosure enable the system to generate, based on images showing target objects with a common characteristic, a 3D representation of the portion of the parking lot within the camera's field of view, and then subsequently generate a 3D boundary within the 3D representation that corresponds to a parking space of the parking lot. In this way, the system may be automatically configured to detect when a car is parked in a particular parking space, for example, to pick up an order at the pick-up location.

In some embodiments, information received based on a camera that was previously trained (e.g., determining a boundary for a parking space within the camera's field of view) can be used to train another untrained camera with an overlapping field of view. For example, the system may detect a license plate that is captured by both cameras (trained and untrained), the license plate being detected within a parking space boundary previously generated with respect to the trained camera. The system may then generate a parking space boundary associated with the untrained camera based in part on parking space boundary information previously generated with respect to the trained camera.

In some embodiments, after a parking space boundary within the camera's field of view has been determined, the system may further be configured to detect a drift of the camera (e.g., small movements over time due to external environmental factors), and, upon detecting the drift, update the 3D representation and/or the 3D boundary. In yet other embodiments, the system may be further configured to detect when the camera has a completely different field of view (e.g., being accidentally bumped), and may transmit a message to a camera administrator that the field of view has been changed and that the camera may require attention, or perform any suitable corrective steps.

The embodiments of the present disclosure may provide many technical advantages over existing systems. Generally, existing systems may rely on manual or automated processes to configure the system to detect if a vehicle is parked in a particular parking space of a parking lot. Manual processes may be tedious and require regular maintenance. For example, a system may require a manual calibration of the camera to determine intrinsic parameters of the camera. The system may also require the manual use of a fiducial to determine extrinsic parameters of the camera. Sometimes, the manual process may involve restricting the camera's field of view to only cover the particular parking space. Not only may this be a time and resource intensive process, but the process may need to be repeated regularly, for example, if the camera field of view drifts over time or if the camera is accidentally bumped. Furthermore, existing automated processes may not be accurate. For example, existing systems may use one or more RF signals. These signals may be subject to signal attenuation, which degrades the quality of coverage. Furthermore, while other non-radio technologies may be employed (e.g., inertial measurement unit (IMU), simultaneous localization and mapping (SLAM), etc.), whereby data is integrated to increase overall accuracy, this often requires additional infrastructure and may require further installation and/or configuration steps. This may especially be the case when configuring the system to determine a boundary of a parking space within the parking lot.

In contrast, the embodiments of the present disclosure provide an automated process that can be properly scaled and that can provide accurate results. In other words, the embodiments provide the technical advantages of scalability and accuracy. In particular, a camera may be mounted to monitor a portion of the parking lot, without additional calibration and/or configuration steps. The system may be automatically configured to generate a 3D representation of the parking lot and generate a 3D boundary for one or more parking spaces of the parking lot. This automatic configuration may be enabled and maintained without requiring further infrastructure beyond the camera. This increases efficiency of configuring and/or maintaining the system. Additionally, multiple cameras may be set-up to monitor the same parking lot, for example, with some cameras having overlapping fields of view. The system can automatically detect this overlap, which may be used to further increase the efficiency of configuring the system. Yet another technical advantage relates to providing accurate results, both at the time of initial configuration as well as continuously monitoring the system to ensure that accurate results are delivered. For example, the system may continuously track (e.g., via external input from a customer check-in process) the rate of accuracy in detecting whether a vehicle is parked in a parking space. If the rate slightly decreases (e.g., corresponding to camera drift), the system may automatically initiate a re-configuration. In this way, the system automatically may self-correct to deliver accurate results.

In the interest of clarity of explanation, the embodiments of the present disclosure are described in connection with a parking lot that includes one or more parking spaces. A camera may be set up to capture images representing a portion of the parking lot that is within the camera's field of view. The portion may contain one or more parking spaces of the parking lot. The camera may also capture vehicles entering/exiting the parking lot and parking in a parking space. Vehicles may have a vehicle license plate connected to the vehicle, whereby the vehicle license plate has a common physical characteristic with other vehicle license plates. However, embodiments are not limited as such. Instead, the embodiments may similarly apply to any physical topography that is divided into a plurality of zones (e.g., locations within a warehouse, drones parked in a zone in mid-air), whereby a camera is set up to capture images of a portion of the physical topography and a target object, the target object having a physical characteristic in common with other target objects and capable of movement within the field of view of the camera.

FIG. 1 illustrates a top-down view of an example location site under camera surveillance, according to an embodiment of the present disclosure. In FIG. 1, a parking area 102 for a pick-up location 108 is depicted. The parking area 102 includes a parking lot 104, and the parking lot 104 includes a plurality of parking spaces (e.g., parking space 106), wherein each parking space may contain a parked vehicle 114, 116, 118, or may be empty 106, 122, 124. In some embodiments, each parking space in the parking lot may be associated with an identifier (e.g., a data label that may be maintained by a service provider system 126). For example, parking space 106 may be called "Parking Space A," and the space immediately adjacent to parking space 106 may be called "Parking Space B," etc. For this parking lot 104, with six parking spaces, the spaces may be labeled A-F (from bottom to top). Any suitable labeling nomenclature may be used. Continuing with the example in FIG. 1, location site 100 depicts vehicle 118 being parked in Parking Space B. It should be understood that, while each parking space may have an associated label that is maintained by the service provider system 126, initially, the service provider system 126 may not maintain a mapping between the parking space labels and the respective parking spaces (e.g., including parking space boundary information) that are within a field of view of a recently mounted camera. The generation of parking space boundary information which enables the mapping of parking space identifiers to 3D boundaries maintained by the system is described in embodiments below. The parking lot 104 may be configured such that there are gaps in between the parking spaces. For example, a parking lot may provide a walkway between one or more spaces to allow people and/or merchandise to be more easily transported to and from cars. Another example may be a parking lot that is covered by a roof, the roof being supported by a supporting pillar structure 107 that subdivides the parking spaces.

In some embodiments, there may be a single camera 110 that is mounted such that the camera's field of view captures one or more of the spaces of the parking lot 104. In other embodiments, there may be more than one camera that is mounted to capture different fields of view. For example, in an embodiment where there are multiple rows of parking spaces in a parking lot, there may be one camera assigned to monitor the parking spaces in that particular row. It should be noted that a camera may be configured such that it not only captures a parking space from a straight-on vantage point (e.g., parking space 124, relative to camera 110), but also parking spaces that are still within the camera's field of view (e.g., parked car 114). In this example, camera 110 may be configured such that cars parked in spaces D-F are within the camera's field of view.

Any suitable photographic camera may be used to implement the methods described in the present disclosure, including, but not limited to, compact digital cameras, digital single-lens reflex (SLR) cameras, mirrorless cameras, action cameras, 360 degree cameras, film cameras, etc. In some embodiments, the camera 110 may be a red-green-blue (RGB) camera. In other embodiments, the camera 110 may be a monochromatic or grayscale camera. The camera 110 should be configured to capture an image of a physical topography in at least a two-dimensional space (discussed in further detail below). It should be noted that the camera 110 may also be a type of video camera (herein, unless limited by an adjective or otherwise, the term "camera" may denote any type of photographic camera, including both still cameras and movie (i.e. video) cameras) that is enabled to record a sequence of images, wherein each image may correspond to a frame. For example, suitable video cameras may include camcorders, surveillance cameras, security cameras, webcams, smartphone cameras, closed-circuit television (CCTV) cameras, etc. The camera 110 may be connected to a service provider computer system 126 that is communicably coupled to the camera, wherein the computer system receives images captured by the camera and does further processing on the images received, as discussed in more detail below. The service provider computer system 126 may be on-premises (e.g., physically bundled with the camera 110) or off-premises (e.g., a server computer system in a separate building).

Continuing with the example of FIG. 1, the pick-up location 108 may be designed to receive orders from customers online. In this scenario, a customer may drive to the pick-up location 108 and enter the parking area 102, as illustrated by vehicle 112. The vehicle 112 may search for an available parking space (e.g., parking space 106) in the parking lot 104 and then proceed to park the car. Although vehicle 112 may still be in the process of searching for a space and not yet parked, the camera 110 may still be configured to capture the vehicle 112 within its field of view. Similarly, a vehicle 120 exiting the parking lot 104 may also be captured by an image taken by the camera 110. However, a computer system that processes images captured by the camera 110 may be configured to filter out vehicles 112, 120 (i.e. non-parked vehicles) from further processing.

The vehicle 112 entering the parking area 102 may locate an available parking space (e.g., spaces 106, 122, 124) in the parking lot 104 and proceed to park. The camera 110 may capture an image of the parked vehicle 112 in one of the parking spaces. As described above, other vehicles may also be captured in the same image. For example, parked vehicles 118, 114, and 116 may also be captured within the image. As discussed above, the captured one or more images may be transmitted to the computer system 126 for further processing.

The computer system 126 may be configured to at least: receive, from the camera 110, a first image of a first plurality of images representing a motion of a first vehicle license plate (e.g., the vehicle license plate of vehicle 112) through a portion of a parking lot 104, the portion being within a field of view 128 of the camera 110. The system may determine, based at least in part on the first image, a location of the first vehicle license plate shown in the first image. The system may determine, based at least in part on the first image, a physical characteristic of the first vehicle license plate shown in the first image, the physical characteristic being common with a second vehicle license plate (e.g., top and bottom corners of a side of a vehicle license plate being a fixed distance from each other). The system may generate a three-dimensional (3D) representation of the portion of the parking lot 104 based at least in part on (i) the location and (ii) the physical characteristic. Subsequent to generating the 3D representation of the portion of the parking lot 104, the system may receive from the camera 110 a second image of a second plurality of images, the second image showing the portion of the parking lot 104 and the second vehicle license plate (e.g., the vehicle license plate of vehicle 114). The system may determine a 3D position of the second vehicle license plate in the 3D representation based at least in part on (i) a second location of the second vehicle license plate shown in the second image, and (ii) the common physical characteristic shown in the second image. The system may determine that a vehicle (e.g., vehicle 114) is parked in the parking lot, the vehicle being associated with the second vehicle license plate. Based in part on determining that the vehicle is parked, the system may determine that the 3D position belongs to a cluster of 3D positions of one or more vehicle license plates shown in the second plurality of images. Finally, the system may generate a 3D boundary of a parking space (e.g., Parking Space D where vehicle 114 is parked) within the portion of the parking lot based at least in part on the 3D positions of the cluster, the parking space corresponding to where the vehicle is parked.

Once the computer system 126 has been configured as described above, the system may utilize the camera 110 to detect when a customer has arrived and parked in a parking space (e.g., Parking Space D), and may then transmit this information to a staff person of the pick-up location 108. In some embodiments, the computer system 126 may do further processing of the license plate. For example, the system 126 may do image recognition of the characters on the license plate to determine the identity of the vehicle license plate. With that information, the system 126 may be able to match a particular parking space with a vehicle, and then further match the vehicle to a customer's order. A staff member may be able to quickly deliver the customer's order to the correct parking space where the customer's vehicle is parked. After the order is fulfilled, the vehicle (e.g., vehicle 120) may leave the parking space and exit the parking area 102. In other embodiments, and as described below, the computer system 126 may utilize the identity of vehicle license plate (determined by a camera that has been trained)

to train another pre-trained camera. As described herein, "training a camera" may be understood to refer to training the computer system which is communicably connected to the camera with a particular field of view, based on images received from the camera.

Figure 2:
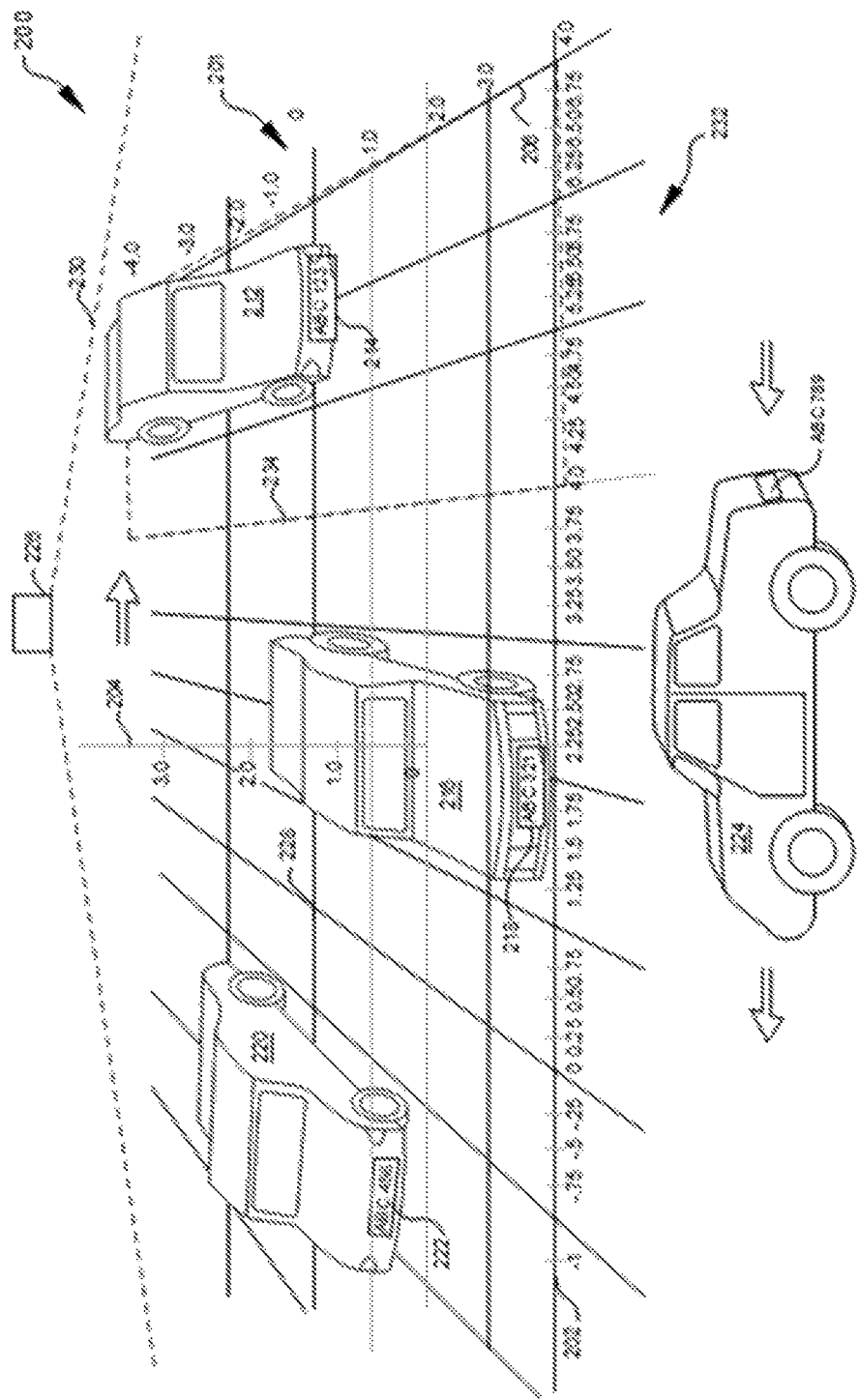
FIG. 2 illustrates a side angle view of an example location site captured by a camera, according to an embodiment of the present disclosure.

FIG. 2 illustrates a side angle view of an example location site 200 under camera surveillance, according to an embodiment of the present disclosure. A camera 226 may be mounted that captures an image of a parking lot 201, wherein the camera's field of view 230 is captured in FIG. 2 from the camera's vantage point. The camera 226 may correspond to the camera 110 of FIG. 1, and the parking lot 201 may correspond to a portion of the parking lot 104 of FIG. 1. It should be understood that, as depicted in FIG. 2, camera 226 may be positioned such that the field of view 230 may capture the license plates 214, 218, 222 of each of the respective vehicles 212, 216, 220. In some embodiments, the camera 226 may further be positioned such that the capture images allow for detection and identification of a unique identifier of each license plate, as discussed further below. The computer system (which may correspond to service provider system 126 of FIG. 1) may receive one or more images from the camera 226. As described below, FIG. 2 further illustrates the results of performing phase one (e.g., generating the 3D representation of the parking lot 104) and phase two (e.g., generating a 3D boundary of a parking space within the 3D representation) of the present disclosure. Subsequent figures describe in greater depth the method of performing phase one and phase two in different embodiments of the present disclosure.

Turning to FIG. 2 in further detail, and specifically regarding generating the 3D representation of the parking lot 201, the computer may receive a plurality of images representing a motion of a target object (e.g., vehicle license plate 218 of vehicle 216) through the parking lot 201 within the camera's field of view 230 represented by FIG. 2. The computer system may, based in part on the plurality of images and a common physical characteristic of the vehicle license plate in each image of the plurality of images, construct a 3D representation 232 (e.g., 3D coordinate space) of the vehicle parking lot 201.

In one embodiment, and as discussed in reference to other figures herein, the 3D representation 232 may include an x-axis 202 (e.g., corresponding to width), a y-axis 204 (e.g., corresponding to height), and a z-axis 206 (e.g., corresponding to depth) relative to the camera's field of view. However, in other embodiments, labels of the coordinate space axes may correspond to different axes in space. For example, the x-axis may correspond to depth instead of width relative to the camera's field of view 230. Furthermore, although for simplicity of illustration, embodiments described below orient the axes in relation to the ground that vehicles may drive on, embodiments of the present disclosure should not be construed to be so limiting. For example, the camera 226 may be mounted at an angle relative to the ground (e.g., tilted in 3D real world space), and the x, y, and z-axes may correspondingly run non-parallel and/or non-perpendicular relative to the ground. Along these lines, the origin 228 of the x, y, and z-axes may be determined independently by the system, and embodiments of the present disclosure may be performed independent of the camera's orientation in the real world physical topography. Additionally, in some embodiments, the physical topography that is included within the 3D representation may be determined by the system. For example, in FIG. 2, vehicle 224 is not depicted as being captured within the 3D representation 232. However, in other embodiments, vehicle 224 may be captured within the 3D representation.

In some embodiments, the distance between coordinates along any given axis may be the same as the distance between coordinates along the other axes, in which case the 3D grid may form a plurality of cubes. In other embodiments, the distance between coordinates along any given axis may be different than the distance between coordinates along the other axes, in which case the 3D grid may form a plurality of cuboids. (Herein, the term "cuboid" may also be used to describe a geometric cube.). It should be understood that although the numerical labels of an axis within the 3D coordinate space 232 may correspond to standard units (e.g., metric units), embodiments of the present disclosure should not be construed to be so limiting. More specifically, and to summarize, the placement of the axes, the labeling of the axes, and the ordering of units along any axis may be determined by the system, independently of the orientation of the camera 226 with respect to the 3D real world.

In FIG. 2, three vehicles 212, 216, 220 are each shown within the 3D representation 232. The vehicles may either be parked or moving within the 3D representation 232 of parking lot 201. As used herein, "parked" may refer to a condition in which a vehicle is not moving within the 3D representation for a predefined period of time (e.g., for at least one minute or some other period of time). In an example where one or more of the vehicles 212, 216, 220 are parked, although each vehicle may be parked in a parking space that is immediately adjacent to another parking space, each vehicle may be parked at a different distance and/or angle from the vantage point of the camera 226. Whether a vehicle is parked or moving, the distance and/or angle of a vehicle license plate from the camera's field of view may cause an image captured by the camera 226 to display each license plate with varying shape and size. As described in reference to subsequent figures below, this information, along with a known physical characteristic common to vehicle license plates, may be used when performing either phase one or phase two of the present disclosure.

Turning to the utilization of the 3D representation 232 that was generated in phase one, phase two involves generating 3D boundaries within the 3D coordinate space 232, whereby each 3D boundary serves to demarcate a particular zone (e.g., a parking space). The 3D boundary may be formed by selecting one or more cuboids formed by the 3D coordinate space 232 of the three axes 202, 204, 206, in which a parking space may include the one or more cuboids. The boundary 234 (represented by dotted lines) for Parking Space F may, as an example, include a range along the x-axis 202 from 4.0-7.0, a range along the z-axis from 4.0-4.0, and a range along the y-axis 204 from 0-3.0. As described earlier, each parking space may be labeled with an identifier (e.g., "Parking Space F", etc.). For example, in FIG. 2, vehicle 212 may be parked in Parking Space F, defined by boundary 234. These boundary identifiers may correspond with human-friendly names (e.g., parking spaces instead of cuboids and/or coordinates), which may make it easier for staff of an order pick-up location to identify a parking space where a vehicle is parked.

Accordingly, once a computer system has completed phase two and generated boundaries that correspond to parking spaces within the 3D representation 232, the computer system may map a license plate of a vehicle to the three-dimensional coordinate space 232 (generated in phase one). The computer system may then further map the license plate to a particular parking space (e.g., Parking Space F)

based on the boundary for the parking space that was generated in phase two. Also, the 3D coordinate system and corresponding parking space boundaries may be used to determine the location of vehicles that may not be parked in a parking space. For example, vehicle 224 may be entering the parking area to park in the parking lot 201. Upon completing phase one and two, the camera 226 may capture an image including vehicle 224, but the system may determine that the vehicle's location corresponds to one or more cuboids of the 3D coordinate system that are not mapped to parking spaces. Accordingly, the system may filter out vehicle 224 from being processed further. The system may also filter out vehicles based on other factors, for example, receiving an indication that the vehicle is still moving (e.g., not parked). Upon filtering out the vehicle 224, the system may not transmit a message to a pick-up location that a customer order is waiting to be filled.

Figure 3:
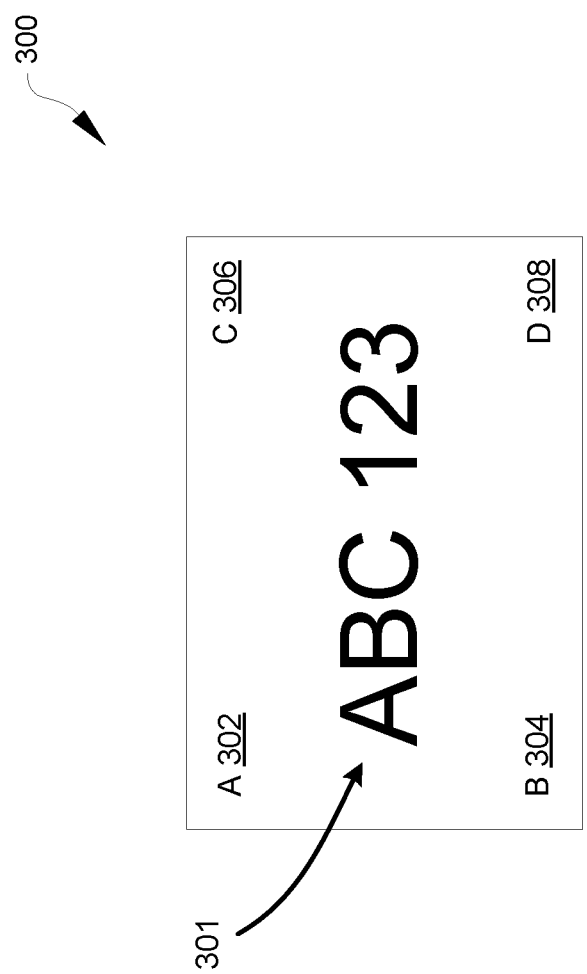
FIG. 3 illustrates characteristics of an example target object captured by a camera, according to an embodiment of the present disclosure.

FIG. 3 illustrates attributes of an example target object captured by a camera, according to an embodiment of the present disclosure. In FIG. 3, the example target object 300 depicted is a vehicle license plate. The vehicle license plate 300 may correspond to any of the vehicle license plates 222, 218, or 214 of FIG. 2. The vehicle license plate 300 has four corners, A 302 and B 304, C 306 and D 308. The vehicle license plate 300 also has an alphanumeric value 301 (e.g., "ABC 123") that is printed on the license plate. The alphanumeric value 301 may correspond to a unique identifier that may be used to identify one license plate (e.g., license plate 214) from another license plate (e.g., license plate 218).

The vehicle license plate 300 may have one or more physical characteristics in common with other vehicle license plates. For example, the vehicle license plate 300 may have a known physical characteristic, where any given license plate of this type has a height of, for example, 15 centimeters. Therefore, in this example, for any given upper corner and lower corner (e.g., respectively, corners 302 and 306, or corners 306 and 308) of a side of a license plate that matches the type of license plate 300, the height distance between the two corners is the same. Another known physical characteristic may be that the license plate 300 is affixed to a vehicle and moves through space that may correspond to the parking lot 201 of FIG. 2. Within a parking lot 201 environment, the vehicle license plate 300 may also have a physical characteristic in that it travels in a two-dimensional (2D) plane that is substantially parallel to the ground. While each vehicle may have the license plate 300 affixed at a different height, for any given vehicle, the license plate 300 travels at a fixed height above the ground. These known physical characteristics of the vehicle license plate 300 may be used when performing phase one and/or phase two of embodiments of the present disclosure.

Figure 4:
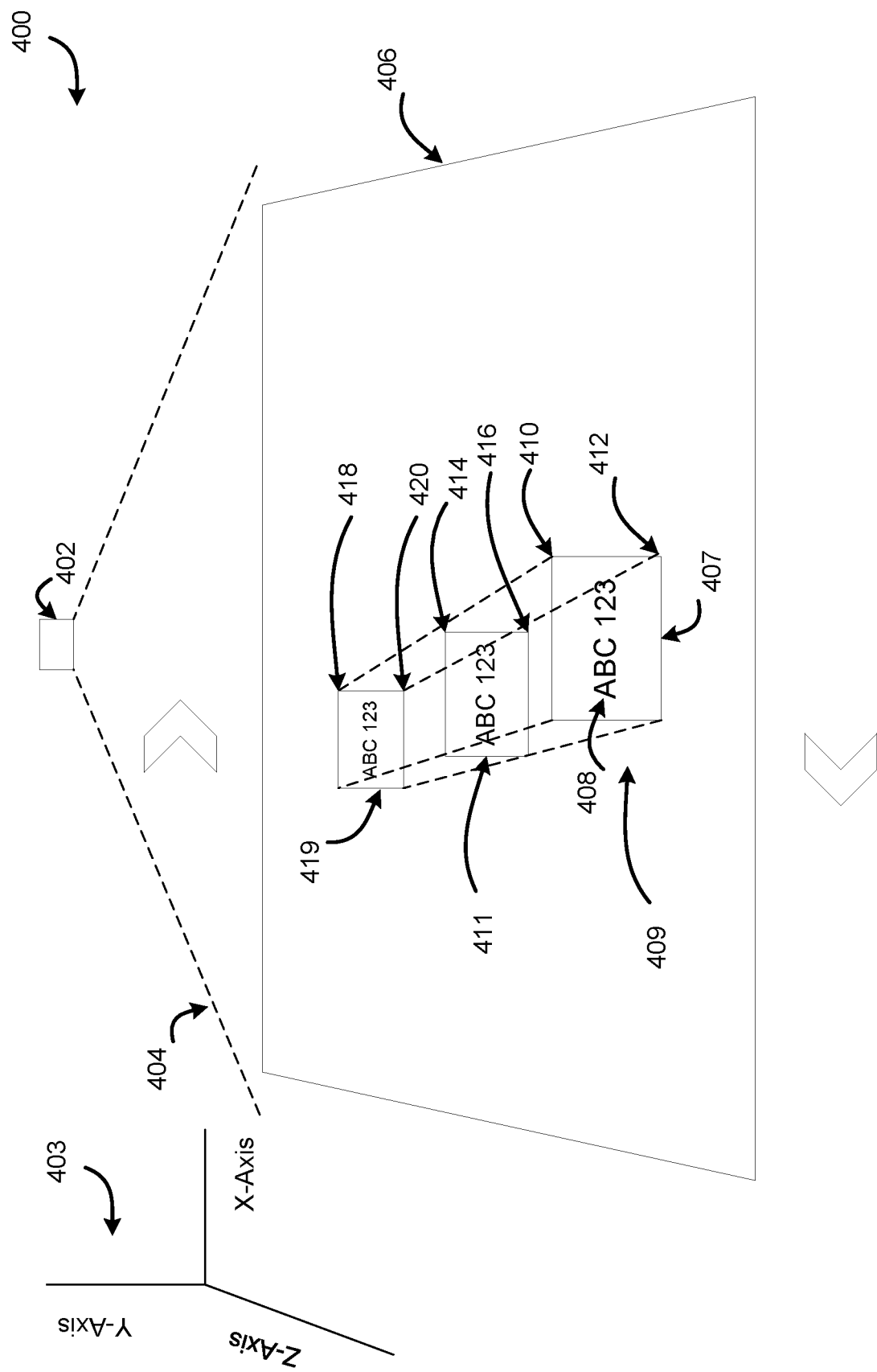
FIG. 4 illustrates an example technique for performing a function of the system, according to an embodiment of the present disclosure.

FIG. 4 illustrates a technique for performing a function of the system at an example location site 400, according to an embodiment of the present disclosure. In particular, FIG. 4 illustrates an example for performing phase one of the present disclosure to generate a 3D representation, similar to the 3D representation 232 depicted in FIG. 2. In FIG. 4, camera 402 may be similar to camera 226 of FIG. 2. Also, it should be understood that camera 402 may be positioned such that its field of view 404 may capture a license plate (e.g., license plate 407), such that a unique identifier 408 of the license plate 407 is detectable and identifiable within images of license plate 407 captured by the camera 402. Parking lot 406 may be similar to parking lot 201 of FIG. 2 (e.g., a portion of parking lot 104 of FIG. 1) that is within the field of view 404 of camera 402.

In FIG. 4, a vehicle license plate 407 is depicted as moving through a space within the parking lot 406 that is parallel to the ground. The license plate 407 may be connected (e.g., affixed) to a vehicle as it moves through the parking lot 406. The camera 402 may receive a plurality of images 409, 411, 419 of the vehicle license plate 407, the plurality corresponding to the movement of the vehicle license plate 407. The diagram 400 illustrated in FIG. 4 depicts each of the 3D vehicle license plates from the images superimposed onto the parking lot 406. Each image of the plurality may capture the license plate 407 at a different point in time, while moving within the parking lot 406. It should be understood that other objects within the field of view 404 of the camera 402 may also be captured (e.g., other vehicles) within each image, provided that the other objects do not block the vehicle license plate 407 (and certain common physical characteristics, described above) from being detected. Each image of the plurality may contain unique identifier 408 that identifies the license plate (e.g., alphanumeric text, as described earlier). This unique identifier 408 may be used to associate images that, collectively, correspond to a motion of a particular license plate (e.g., plate 407). Each image of the plurality may also depict one or more known physical characteristics of the vehicle license plate 407, for example, the upper and lower corners of a side of the license plate. For example image 409 may contain an upper corner 410 and a lower corner 412, image 411 may contain an upper corner 414 and a lower corner 416, and image 419 may contain an upper corner 418 and a lower corner 420.

In some embodiments, the system may generate the 3D representation by using several known physical characteristics of the vehicle license plate 407, described above. First, the system knows that the license plate 407 is moving in at least the X-Z plane (e.g., movement along both the x-axis and the z-axis, using an example labeling of the axes 403 as shown in FIG. 4). Movement of the license plate 407 along the y-axis may be optional, particularly when performing phase two to generate 3D boundaries of parking spaces that are positioned only in the X-Z plane. Second, as described above, the system is able to detect the license plate 407 in each image of the plurality of images, and determine that it is the same plate traveling through the parking lot space 406. In some embodiments, this may be performed by receiving a sequence of images, each image having a timestamp that determines the order of images. In other embodiments, the plurality of images may not be ordered as a sequence. However, as described above, the system may still be able to detect (e.g., using an Automated License Plate Recognition (ALPR) algorithm) the license plate and receive an indication (e.g., via detection of the unique identifier on the license plate and/or a camera administrator) that the same license plate is moving in the parking lot 406. Third, the system may possess data corresponding to a physical characteristic of the license plate 407. For example, as described above in reference to FIG. 3, the physical characteristic may be a known distance between the upper and lower corner of a side of the license plate. Fourth, the system may know that, for a given vehicle (e.g., with license plate 407 affixed), the license plate 407 travels at a fixed height above the ground (e.g., a 2D plane parallel to the ground).

Based at least on the knowledge of these physical characteristics of the vehicle license plate 407, the system may generate a 3D representation of parking lot 406. In one embodiment, the system records a series of 2D positions (e.g., of the top and bottom corners) of the license plate 407 as it travels through the parking lot 406, based on the location (e.g., which may be a pixelated value) of the license plate shown in the 2D image. The system may then may input the series of 2D positions into a transformation model that converts a 2D point from the series into a 3D point. The transformation model may utilize known characteristics of the vehicle license plate 407. For example, because one of the known characteristics is that the license plate 407 travels in a plane that is parallel to the ground, the error rate for the 2D-to-3D conversion process may be minimized. In some embodiments, the transformation model may also utilize the physical characteristic of the height of the license plate 407 to provide additional constraints to the transformation model. For example, as the plate moves parallel to the ground, the transformation model may receive as input 3D points corresponding to the top of the license plate (e.g., upper corners 410, 414, 418) as it travels through space. The transformation model may also receive as input 3D points corresponding to the bottom of the license plate (e.g., lower corners 412, 416, 420). This may result in two parallel planes (e.g., parallel to the ground) being evaluated by the transformation model to determine a correct depth measurement. In some embodiments, the transformation model may also take into account that the pixelated height (e.g., location) of the license plate 407 as shown in each image may change as the license plate 407 distance from the camera varies with movement over time. In this way, the transformation model may determine, for example, an accurate depth measurement when generating the 3D representation of the parking lot 406.

It should be understood that FIG. 4 represents a simplified view of a movement of a single license plate 407 through the parking lot 406. In some embodiments, the system may receive a larger set of image samples, which may correspond to a richer set of movements by the same license plate 407 (e.g., smaller time intervals between each image captured, more variety of movements across the X-Z plane). In some embodiments, the system may receive multiple series of movements, each series corresponding to a movement of a different vehicle in the parking lot 406. This may further enable increasing the dataset to improve accuracy when generating the 3D representation via the transformation model. As described above, even though the position of a vehicle license plate on a vehicle (e.g., height of the plate from the ground) may vary (e.g., depending on the vehicle type, etc.), the height of the plate in any particular series of movement of a vehicle may remain fixed as the particular vehicle moves through the parking lot 406. Thus, the system may receive data corresponding to an assumption that movement of the license plate may remain parallel to the ground, which may increase the accuracy of conversion from 2D to 3D when generating the 3D representation of the field of view 404 of the camera 402. Additionally, because a known characteristic is that license plates across multiple series of movements (e.g., from multiple vehicles) have the same physical characteristic (e.g., distance between an upper corner and lower corner of the license plate is fixed), the system may utilize data from the multiple series when fitting the transformation model. Finally, in some embodiments, the ground may not be flat. For example, there may be portions where the ground dips or is raised (e.g., a speed bump). However, the method of phase one may still be performed as long as a plurality of images may be selected from a movement of a vehicle such that the selection represents movement of the vehicle along a 2D plane parallel to the ground.

Figure 5:
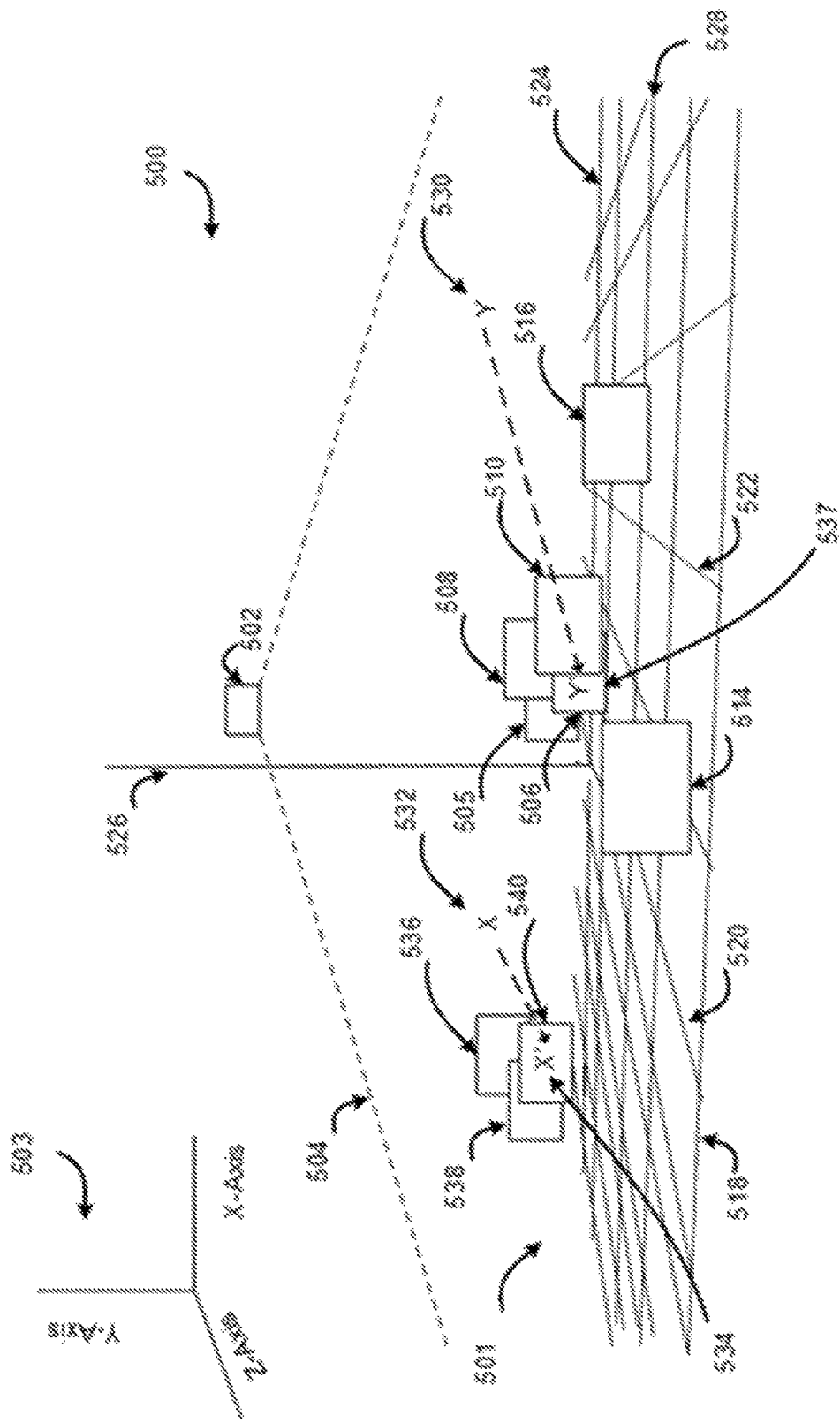
FIG. 5 illustrates an example technique for performing a function of the system, according to an embodiment of the present disclosure.

FIG. 5 illustrates an example technique for performing a function of the system at an example location site 500, according to an embodiment of the present disclosure. In particular, FIG. 5 illustrates an example for performing phase two of the present disclosure to generate a 3D boundary of a parking space of a parking lot, based on the 3D representation of the parking lot that was previously generated in phase one. The 3D boundary that is generated from the technique illustrated in FIG. 5 may be similar to the boundary 234 of 3D representation 232 depicted in FIG. 2. In FIG. 5, camera 502 may be the same as camera 402 of FIG. 4, having a field of view 504 that corresponds to the field of view 404 of camera 402. Parking lot 501 also may be the same as parking lot 406 (e.g., the same portion of parking lot 104 of FIG. 1). Also, 3D representation 528 may be the 3D representation generated from the technique of FIG. 4. For clarity of explanation, the example axes 503 may correspond to example axes 403 of FIG. 4.

In FIG. 5, a plurality of vehicle license plate 3D positions (e.g., position 516, position 510, position 514, etc.) is represented by rectangular boxes in the 3D representation 528. Specifically, in phase two, the camera 502 may capture a plurality of images, each image of the plurality showing at least one vehicle license plate. Based on the 3D representation generated in phase one, the system may determine a 3D position of each vehicle license plate shown in each image within the 3D representation. The diagram illustrated in FIG. 5 depicts each of the 3D vehicle license plate positions determined from the images superimposed into the 3D representation 528. The 3D position of each vehicle license plate may be determined similarly to the way that the 3D representation 528 was generated. Specifically, the system may receive data corresponding to a physical characteristic common to other vehicle license plates (e.g., the distance between an upper and lower corner of a side of a license plate). Based on this data and the location (e.g., the pixelated coordinates) of the physical characteristic of a vehicle license plate in a particular image, the system may calculate a 3D position of the vehicle license plate within the 3D representation.

Continuing with phase two, for each of the vehicle license plate 3D positions determined in each image of the plurality of images, the system may determine if the vehicle (e.g., to which the vehicle license plate is affixed) is parked or not. In one embodiment, the system may utilize data received, independent from the image data, to determine that the vehicle was parked. For example, where the parking lot 501 is a portion of a parking lot of a customer pick-up location, a customer may drive to the pick-up location and park the vehicle in a particular parking space. In some embodiments, the customer may be automatically checked in. For example, the system may recognize the license plate lettering (e.g., identifier) via ALPR and then associate the identifier with the customer order. In other embodiments, the customer may be manually checked in. For example, the customer may check in via a mobile application, or a staff member on site may check the customer in. Upon being checked in, the staff member may fulfill the customer's order and then bring the ordered goods to the customer's vehicle while the vehicle is parked.

In another embodiment, the system may utilize image data to determine that a vehicle is parked. For example, the system may receive data corresponding to a dwell time threshold. The dwell time threshold may correspond to a predefined time interval, such that, if a vehicle license plate is determined to be in the same position for a time interval greater than the dwell time threshold, then the vehicle may be determined to be parked. More specifically, the system may receive a first image with an associated first timestamp, the first image showing a particular vehicle license plate. The system may subsequently receive a second image associated with a second timestamp, the second image showing the particular vehicle license plate. The system may then determine that the 3D position of the particular vehicle license plate is substantially the same (e.g., negligible movement). The system may also determine that a difference between the first timestamp and the second timestamp matches the dwell time threshold. In some embodiments, "matching" a dwell time threshold may correspond to the difference being greater than the dwell time threshold. In other embodiments, "matching" a dwell time threshold may correspond to the difference being greater than or equal to the dwell time threshold. Upon determining that the vehicle has not moved for a period of time that matches the dwell time threshold, the system may thereby determine that the vehicle (e.g., including the vehicle license plate) was parked.

Continuing with phase two, the system may determine to filter out images (and corresponding vehicle license plate positions) when the system determines that the vehicle license plate does not correspond to a parked vehicle. Based on the remaining 3D positions of vehicle license plates, the system may then determine 3D boundaries for parking spaces within the 3D representation 528. In one embodiment, and for illustration purposes, the 3D license plate positions depicted in FIG. 5 represent 3D positions for license plates of vehicles that were determined to be parked (e.g., other non-parked license plates have already been filtered out). In some embodiments, phase two may proceed by determining a cluster of 3D positions to which each 3D position of a parked vehicle license plate may belong. Based on the determined cluster of 3D positions, the system may generate a 3D boundary encompassing the cluster of 3D positions. More generally, it should be understood that in some embodiments corresponding to determining a boundary of a zone within a physical topography, the system may determine a cluster of 3D positions that it uses to generate the boundary independently of whether the vehicle is parked in the zone.

It should be understood that the system may perform the clustering using any suitable algorithm. In a non-limiting example, the system may utilize K-means clustering. For example, the system may perform the clustering algorithm by initializing a group of center points, each center point corresponding to a center of a particular cluster of 3D positions of vehicle license plates. In some embodiments, each center point may be represented by a vector. The number of center points (e.g., and corresponding clusters) that may be initially chosen and the position in which they are initially placed within the 3D representation may be chosen in any suitable way. In an example, the number of center points chosen may correspond to an average expected number of parking spaces that may be captured within the camera's field of view 504 that is mounted in the parking lot 501, and may be equally spaced within the 3D representation. The algorithm may then compute a distance between an aspect of the 3D position of a given license plate (e.g., a 3D point that is the center of the perimeter of the license plate, represented as a vector) and an aspect of a cluster of 3D positions (e.g., a center point vector of a particular cluster). The algorithm may then classify the 3D point to be in a group whose center point is closest to it. Based on these classified points, the system may re-compute the group center by taking the mean of all the vectors in the group. The system may repeat these steps for a number of iterations until the group centers converge (e.g., the movement of group center points between iterations in minimal). The clustering algorithm may be initialized and re-run multiple times to achieve better clustering results (e.g. choosing a different number of center points per iteration). Additionally, as discussed further below (e.g., in reference to FIG. 9), the algorithm may be re-run upon determining that the camera's field of view 504 may have changed. Other clustering algorithms that may be employed include, but are not limited to, mean-shift clustering and density-based spatial clustering of applications with noise (DBSCAN).

As an example of performing the clustering process utilizing K-means clustering algorithm within the embodiment depicted in FIG. 5, the system may first determine two center points, for example, based on received data indicating that two parking spaces are likely to be within a camera's field of view 504 of the portion of the parking lot 501. A first group (e.g., cluster) center point 530 ('Y') may be initialized within the 3D representation 528, and a second group center point 532 ('X') may also be initialized within the 3D representation 528. The clustering algorithm may then classify each vehicle license plate to belong to a particular group (e.g., the group whose group center point is closest to the 3D position of the vehicle license plate). For example, license plates 505, 506, 508, 510, 514, and 516 may be classified as belonging to the Y group 530, whereas the license plates 536, 538, and 540 may be classified as belonging to the X group 532. As described above, based on these classified points, the system may re-compute the group centers (for each group X, Y) by taking the mean of all the vectors in each group. The system may repeat these steps for a number of iterations until the group centers converge. In this example, the group center for group Y may converge at center point 537 ('Y") and the group center for group X may converge at center point 534 ('X"). Although, in this example, the composition of each cluster did not change over each iteration (although the position of the cluster center point did change), it should be understood that in other embodiments, the composition of one or more clusters may change as iterations are performed.

In some embodiments, once each cluster (and the corresponding center point of a cluster) has been determined, the system may determine a 3D boundary of the parking space in any suitable way. For example, the system may receive data corresponding to the expected dimensions of a generic vehicle. Based on the expected dimensions of the generic vehicle, the system may construct a 3D boundary around the center point of a given cluster. In an example involving the cluster with center point Y' 537, the system may determine a 3D boundary within the 3D representation 528 along each of the axes 503. For example, along the z-axis (in this case, corresponding to depth), the system may determine a range from z-coordinate 518 to z-coordinate 524. Along the x-axis (in this case, corresponding to width), the system may determine a range from x-coordinate 520 to x-coordinate 522. In this example, where there may be no roof (or second level) to the parking lot, a range along the y-axis 526 may be determined by the system in any suitable way (e.g., determined by a system administrator). It should be understood that with this particular boundary definition, license plate 514 would be within the defined boundary. For example license plate 514 may represent a vehicle which was parked at a different depth within the parking space than most vehicles, but still nevertheless was parked in that space. In contrast, license plate 516 may be determined by the system to be an outlier, and thus excluded from the boundary. In some examples, license plate 516 may represent a vehicle that was not properly parked in a recognized parking space (e.g., Parking Space F of FIG. 1, where vehicle 116 is parked). For example, it could be a staff worker vehicle that was temporarily parked while performing maintenance operations.

In some embodiments, the system may determine the 3D boundary for a space based on a confidence level. For example, in FIG. 5, license plates 505, 506, 508, and 510 are generally centered in a similar position. As the number of data samples grow with more parked vehicle license plates captured, the system may determine with a sufficient confidence level that the cluster center is at position Y' 537 (or X' 534), and then may set the boundary accordingly. It should be understood that embodiments of the present disclosure may be performed whether a license plate is connected to the front or back of a vehicle.

Figure 6:
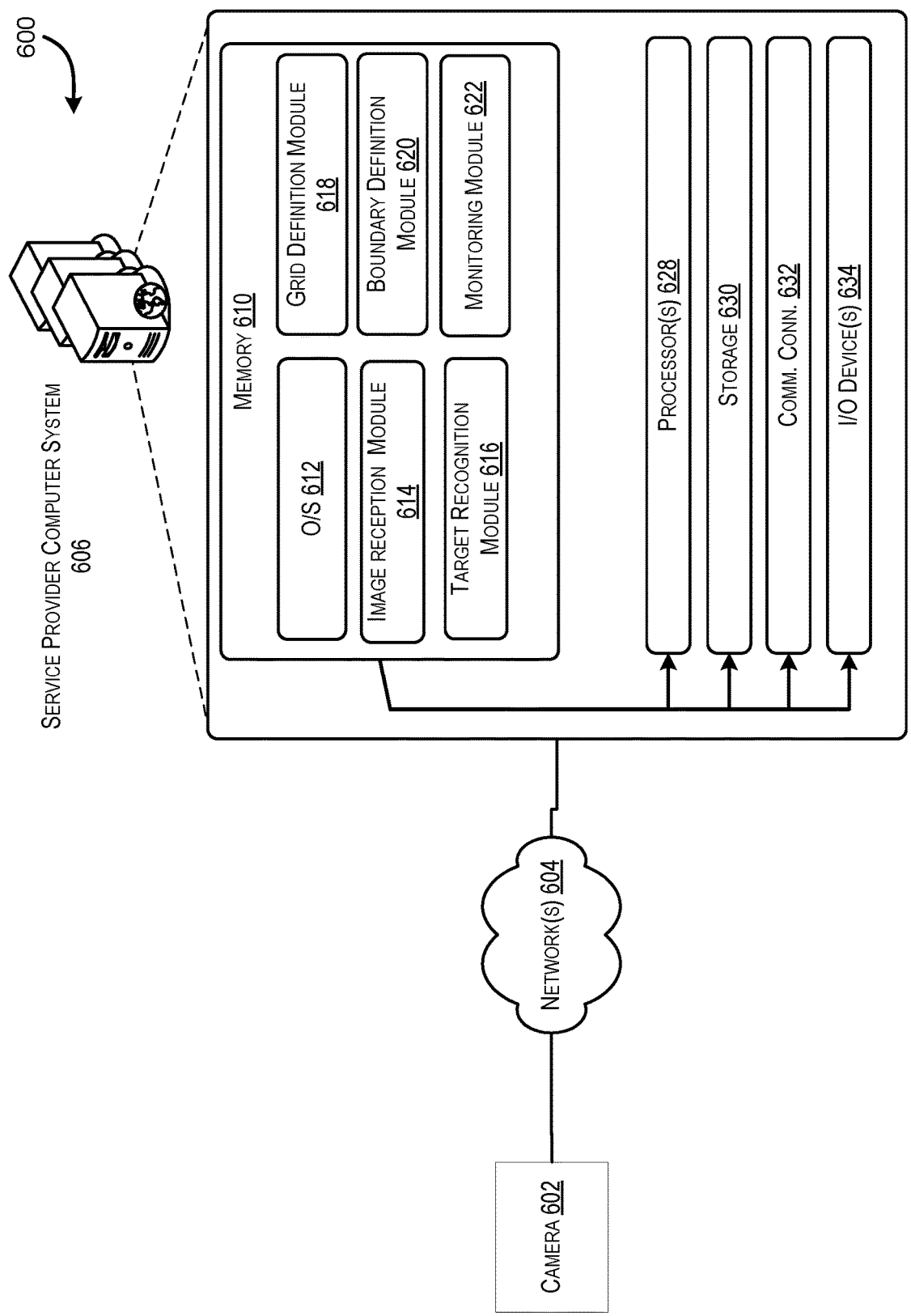
FIG. 6 illustrates a block diagram of an example architecture for a system utilizing a camera to perform one or more functions of the system, according to an embodiment of the present disclosure.

FIG. 6 is a block diagram of an example architecture 600 for a service provider system 606 utilizing a camera 602 to perform one or more functions of the system, according to an embodiment of the present disclosure. The system may include a camera 602, which may correspond to the camera 110 of FIG. 1, camera 226 of FIG. 2, camera 402 of FIG. 4, and/or camera 502 of FIG. 5. The camera 602 should be configurable to capture images of a quality such that target object recognition may be performed on the image. In some embodiments, an off-the-shelf camera (e.g., capable of capturing 2D images) may be used. In some embodiments, the camera should be capable of capturing images within a certain pixel resolution range that is sufficient to perform target object recognition on the image. This may vary depending on the type of target object the system has been trained to recognize. For example, for a system intended to recognize the characters on license plates, a 1080P resolution may be sufficient. However, for determining only the existence of a license plate in a particular location, a lower resolution (e.g., 720P) may be sufficient. It should be understood that embodiments of the present disclosure do not require a 3D camera, stereoscopic camera, time-of-flight camera, or other more expensive device. Accordingly, a camera suitable to perform the method may require significantly less resources (financial and/or human) to purchase, setup, and maintain.

The camera 602 may be communicatively coupled to a computer system 606 of a service provider via a network 604. The network 604 may include any suitable communication path or channel such as, for instance, a wire or cable, fiber optics, a telephone line, a cellular link, a radio frequency (RF) link, a WAN or LAN network, the Internet, or any other suitable medium. The network 604 may include any one or a combination of many different types of networks, such as cable networks, the Internet, wireless networks, cellular networks, and other private and/or public networks. In some embodiments, the camera device 602 may be coupled via hardware to the computer system as part of a single hardware unit.

Turning to the contents of the computer system 606 in more detail, the computer system 606 may comprise at least one memory 610, one or more processing units (or processor(s)) 628, a storage unit 630, a communication device 632, and an I/O device 634. The processor(s) 628 may be implemented as appropriate in hardware, computer-executable instructions, firmware or combinations thereof. Computer-executable instruction or firmware implementations of the processor(s) 628 may include computer-executable or machine executable instructions written in any suitable programming language to perform the various functions described.

The memory 610 may store program instructions that are loadable and executable on the processor(s) 628, as well as data generated during the execution of these programs. Depending on the configuration and type of service provider system 606, the memory 610 may be volatile (such as random access memory (RAM)) and/or non-volatile (such as read-only memory (ROM), flash memory, etc.). In some implementations, the memory 610 may include multiple different types of memory, such as static random access memory (SRAM), dynamic random access memory (DRAM) or ROM. The service provider system 606 may also include additional storage 630, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. The service provider system 606 may also contain communications connection(s) 632 that allow the service provider 606 to communicate with a stored database, another computing device or server, user terminals, and/or other devices on the network(s) 604. The service provider system 606 may also include input/output (I/O) device(s) and/or ports 634, such as for enabling connection with a keyboard, a mouse, a pen, a voice input device, a touch input device, a display, speakers, a printer, etc.

Turning to the contents of the memory 610 in more detail, the memory 610 may include an operating system 612 and one or more application programs or services for implementing the features disclosed herein, including an image reception module 614, a target (e.g., target object) recognition module 616, a grid definition module 618, a boundary definition module 620, and a monitoring module 622.

The operating system 612 may provide executable program instructions for the general administration and operation of that service provider computer system 606 and typically will include a computer-readable storage medium (e.g., a hard disk, random access memory, read only memory, etc.) storing instructions that, when executed by a processor of the computer system 606, allow the computer system 606 to perform its intended functions. Suitable implementations for the operating system and general functionality of the servers are known or commercially available and are readily implemented by persons having ordinary skill in the art, particularly in light of the disclosure herein.

The image reception module 614 may be responsible for receiving an image that is captured by camera 602 as input to the service provider computer system 606. The image reception module may, optionally, perform further processing on the image to prepare the image for transmission to the target object recognition module 616, discussed below. For example, image reception module 614 may compress the image, adjust the image's color level, brightness, sharpness, contrast, white balance, and/or apply filters to the image. The image reception module may also store the image to the storage unit 630, for example, to be used in future training of the target object recognition module 616. The image reception module 614 may also be configured to process a sequence of images (i.e. frames) from a video stream, and may select a sample rate at which to select images for transmission to the target object recognition module 616. For example, for a particular video content comprising frames at a rate of twenty-four frames per second, the module 614 may select one frame per second for transmission to the target object recognition module 616.

The target object recognition module 616 may be responsible for performing target object recognition on an image received from the image reception module 614. That is, the target object recognition model 616 is utilized to recognize a target object, for example, a vehicle license plate, in an image. The target object recognition module 616 may utilize any suitable algorithm for performing the image recognition, including, but not limited to, an artificial intelligence model that is used to perform ALPR. As used herein, the term "artificial intelligence" refers to any suitable computer-implemented artificial intelligence technique including machine learning (supervised or unsupervised), natural language processing, machine perception, computer vision, affective computing, statistical learning and classification (including use of hidden Markov models, Bayesian network models and Kalman filters), reinforcement learning including neural networks, search algorithms and optimization algorithms (including evolutionary computing) and automated reasoning. As an example, an artificial intelligence model may be trained to recognize (e.g., "infer") a vehicle license plate affixed to a car as a target object type. The training data may include a wide variety of images, with license plates captured from various camera angles and affixed to vehicles with slightly different configurations (e.g., the height at which a license plate is affixed to the vehicle relative to the ground may vary depending on the type of vehicle). As a result, the trained target object recognition module 616 may be able to recognize license plates in a variety of positions captured. Note that, similar to the other modules described, the target object recognition module may be embedded with the camera 602 as part of a single camera unit. In some embodiments, the target object recognition module 616 may also be trained to detect not only the position of a license plate within an image captured by the camera 602, but also detect the characters on the license plate (e.g., using optical character recognition, character segmentation, normalization, etc.).

After performing target object recognition on an image (or a frame in a video sequence of frames), in some embodiments, the target object recognition model 616 may output a target object attributes dataset. The target object attributes dataset may include a list of attributes for the particular target object that was recognized within the image, wherein the list of attributes corresponds to the particular target object type of the target object. For example, a vehicle license plate type may comprise a list of attributes describing the pixel coordinates for each of the four corners (A 302, B 304, C 306, and D 308, as shown in FIG. 3) of the license plate, as well as the alphanumeric value 301 of the license plate. Each attribute may be described by an "attribute name":"attribute value" pairing. For example:
{
"license plate value": "ABC 123"
"topLeftX": 0,
"topLeftY": 0,
"topRightX": 100,
"topRightY": 0,
"bottomLeftX": 0,
"bottomLeftY": 100,
"bottomRightX": 100,
"bottomRightY": 100
}
In this example, the alphanumeric value 501 of the license plate corresponds to "ABC 123," which, as discussed above, may be inferred by optical character recognition. The other attributes may correspond to pixel coordinates for each of the four corners along an x-axis and a y-axis in a 2D coordinate plane.

The grid definition module 618 (e.g., "3D representation generation module") may be responsible for creating a 3D representation of a physical topography, wherein the physical topography is within the camera's 602 field of view and is captured within an image. The process of creating the 3D representation in 3D coordinate space may be similar to as described in reference to FIG. 4. It should be understood that, whereas existing methods may require a camera calibration process (e.g., determining intrinsic and/or extrinsic parameters of the camera) in order to create the 3D representation, embodiments of the present disclosure enable creating a 3D representation with the method described in FIG. 4, without first determining intrinsic and/or extrinsic parameters through an additional process. In some embodiments, the grid definition model 618 may store and/or retrieve data corresponding to common physical characteristics of a target object in memory 610 and/or storage 630. Subsequent to creating the 3D representation based on a common physical characteristic of the target object, the system may then create a 3D boundary of a zone within the 3D representation.

The boundary definition module 620 may be responsible for creating a 3D boundary of a zone of a physical topography within a 3D representation, the zone being within camera's 602 field of view and captured within an image. The process of creating the 3D boundary of the zone in the 3D representation may be similar to as described in reference to FIG. 5. In this way, and in contrast to existing methods, a system may train a camera to detect target objects within a zone of a physical topography in an automated way.

The monitoring module 622 may be responsible for one or more system functions that follow an initial execution of grid definition module 618 and boundary definition module 620. In an example, monitoring module 622 may be configured to execute in a system background and continuously monitor the performance (e.g., accuracy) of the 3D representation and/or the 3D boundaries determined within the 3D representation. Continuing with the earlier example involving a parking lot, the monitoring module 622 may detect if the camera 602 field of view has been substantially changed, such that external maintenance needs to be performed on the camera 602. For example, the camera 602 may have been accidentally bumped, and the field of view points in a completely different direction (e.g. away from the parking lot). The monitoring module may detect this, and determine corrective steps to be taken. In one example, the system may transmit a warning message to an administrator of the camera 602. In another example, the monitoring module 622 may detect if the camera 602 field of view has been slightly changed, for example, due to a drift of the camera over time. Upon detecting a slight change, the monitoring module 622 may determine that the degree of drift exceeds an acceptable threshold level, such that the system should take corrective steps. In one embodiment, the corrective steps may involve re-invoking the grid definition module 618 and/or the boundary definition module 620 to re-train the camera. Examples of performing corrective steps upon detecting a change of the camera's field of view are discussed further below in reference to FIG. 9.

In another example, the monitoring module 622 may be executed by the system to assist in training a new camera (not shown). For example, camera 602 may have been previously trained by the system executing grid definition module 618 and boundary definition module 620 with respect to camera 602. The new camera may be mounted next to camera 602, such that the new camera has an overlapping field of view with camera 602. For example, the new camera's field of view may capture license plates within the 3D boundary associated with cluster center point Y' 537 of FIG. 5. As described further below in reference to FIG. 10, the system may detect that there is an overlapping field of view between the two cameras (e.g., detecting that both cameras capture the same license plate at a particular point in time), and then utilize information regarding the 3D boundary within which the license plate was captured (e.g., by the trained camera) to train the new camera. For example, the system may utilize the existing 3D boundary information associated with the trained camera to determine a new 3D boundary associated with the untrained camera, and then associate that new 3D boundary with the same human-friendly zone identifier (e.g., Parking Space F) that the existing 3D boundary of the trained camera is associated with. In another example, once the system determines that there is an overlapping field of view between two cameras, the system may also utilize this information to detect if a field of view of one or both of the cameras has been changed (e.g., which may cause the system to alert a camera administrator and/or retrain one or both of the cameras).

Figure 7:
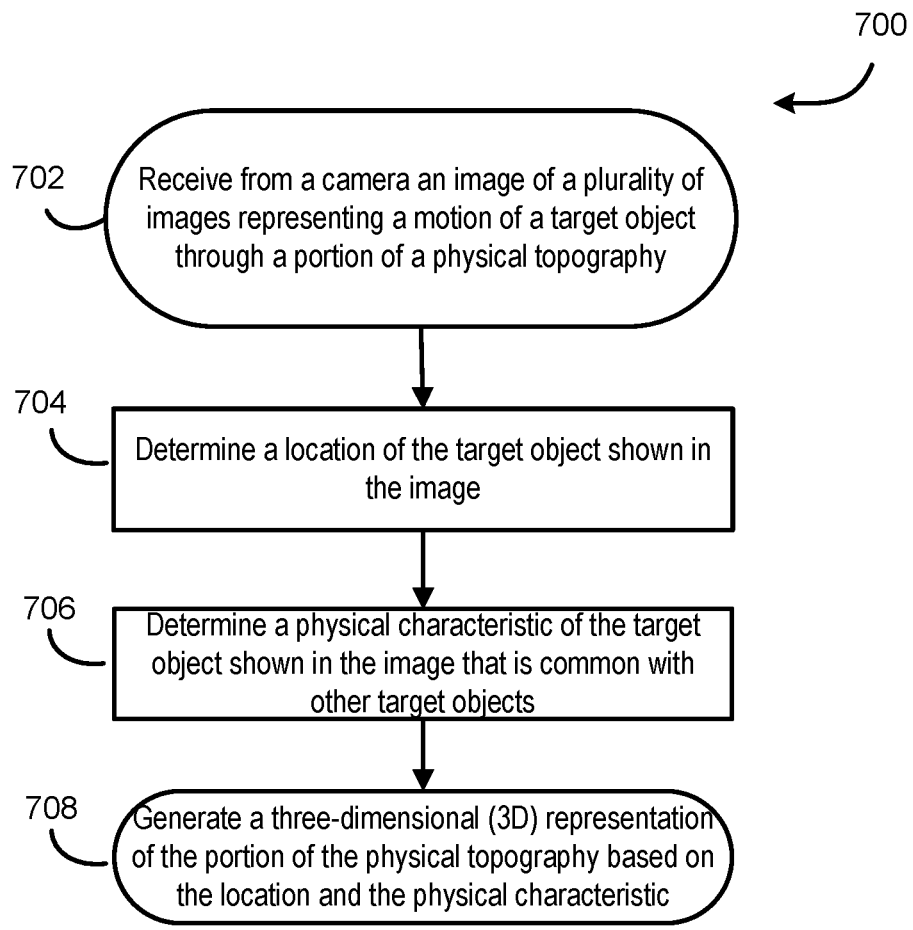
FIG. 7 illustrates an example flow for performing a function of the system of FIG. 6, according to an embodiment of the present disclosure.

FIG. 7 illustrates an example flow 700 for generating a 3D representation of a physical topography by a computer system (which may correspond to the service provider computer system 606 of FIG. 6), according to an embodiment of the present disclosure. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The example flow may start at operation 702, where the system may receive, from a camera, an image of a plurality of images representing a motion of a target object through a portion of a physical topography. As discussed above, and as referenced below in the subsequent flow descriptions of FIGS. 7-10, the camera correspond to camera 602 of FIG. 6. Also, the physical topography may be a parking lot (e.g., parking lot 104 of FIG. 1), the parking lot containing one or more parking spaces. The camera 602 may have a field of view that captures a portion of the parking lot (e.g., portion 201 containing one or more parking spaces). In some embodiments, the camera's position may be fixed along with the corresponding field of view of the camera (e.g., mounted on a platform that overlooks the portion of the parking lot). The target object may be a vehicle license plate, connected to a vehicle, whereby the vehicle is moving through the portion of the parking lot. In some embodiments, the vehicle's motion may at least be within a plane of the parking lot that corresponds to depth, and a plane of the parking lot that corresponds to width. In other embodiments, the vehicle's motion may optionally include movement within a plane that corresponds to height (e.g., slope) in the real world.

At operation 704, the system may determine a location of the target object shown in the image received at operation 702. In some embodiments, the system may first execute the image reception module 614 and then invoke the target recognition module 616 to determine that the target object is shown in the image (e.g., using ALPR to recognize a license plate). The system may then determine the location of the target object shown in the image by determining the 2D pixel coordinates of the target object.

At operation 706, the system may determine a physical characteristic of the target object shown in the image that is common with other target objects. For example, in the case of a license plate, the system may determine the pixel coordinates of the four corners of the recognized license plate. In some embodiments, the system may retrieve data corresponding to the common physical characteristics of the target object from memory 610 and/or storage 630 (e.g., the dimensions of a standard vehicle license plate). The system may then determine (e.g., based on the proportion of the lengths of the sides of the license plate, lettering on the license plate, etc.) that the license plate is common with other license plates of that type. The system may then use this information, combined with the pixel coordinates of two or more corners (e.g., a side) of the same license plate shown in each image, to generate the 3D representation, discussed below at operation 708. In some embodiments, other common characteristics may be employed. For example, this could include a width of a target object, or, more generally, a dimension of the target object that is measurable within a 2D coordinate space and mappable to a 3D coordinate space.

At operation 708, the system may generate a 3D representation of the portion of the physical topography based on the location of the target object in the image and the common physical characteristic. In some embodiments, and as described in reference to FIG. 4, the system may determine the location of the target object in the image for each of the images of the plurality of images discussed in reference to operation 702. Then, based on the data received by the system about the common physical characteristic and the relative size (e.g., location) of the physical characteristic as shown in each of the images of the plurality of images, the system may compute a 3D representation of the portion of the physical topography within the camera's field of view based on a transformation model. In some embodiments, the license plate may move only in the X-Z plane (e.g., width and depth, respectively). In that case, the x-axis and z-axis may have coordinates that are derived based on the relative measurements of the physical characteristic, whereas the coordinates of the y-axis may be determined by the system via another mechanism (e.g., input by an administrator of the system). In other embodiments, the license plate may move in the X-Y-Z planes (e.g., width, height, and depth, respectively). In that case all the axes' coordinates may be derived based on the physical characteristic and the location of the license plate within each image of the plurality of images. It should be understood that a larger corpus of images may enable a higher level of precision when generating the 3D representation. For example, a given plurality of images may be composed based on images received over smaller time intervals over a period of movement of a single license plate. The plurality of images might also cover a wider range of movement within the portion of the physical topography. In another example, multiple pluralities (e.g., series) of images may be received, each plurality of images corresponding to motion of a different vehicle (e.g., with a different license plate per vehicle), as described in reference to FIG. 4.

Figure 8:
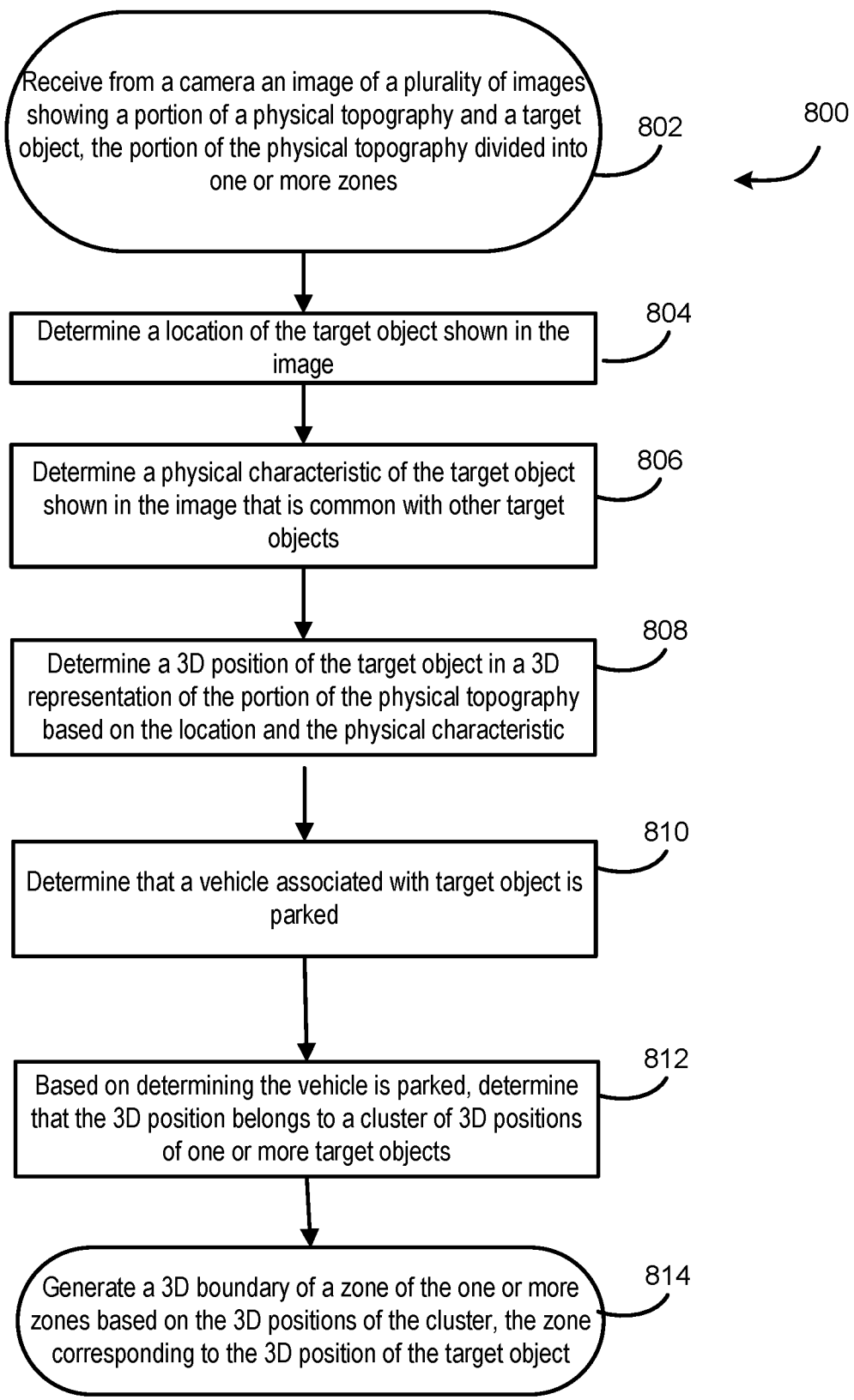
FIG. 8 illustrates an example flow for performing a function of the system of FIG. 6, according to an embodiment of the present disclosure.

FIG. 8 illustrates an example flow 800 for generating a 3D boundary of a zone of a physical topography by a computer system (which may correspond to the service provider computer system 606 of FIG. 6), according to an embodiment of the present disclosure. In some embodiments, the operations of FIG. 8 may be executed after the computer system has generated the 3D representation of the physical topography according to the operations of FIG. 7.

The example flow may start at operation 802, where the system may receive from a camera an image of a plurality of images showing a portion of a physical topography and a target object, the portion of the physical topography being divided into one or more zones. As discussed above, the camera may correspond to camera 602 of FIG. 6 and may be the same camera (with the same field of view) that was described in reference to the flow in FIG. 7. Also, the portion of the physical topography and corresponding zones may generally be the same as described in reference to operation 702 of FIG. 7 (e.g., a parking lot with one or more parking spaces). In contrast to operation 702, in which a given plurality of images represented motion of the same target object through a portion of the physical topography, here, and as described in reference to FIG. 5, each image of the plurality of images may show one or more different target objects (e.g., vehicle license plates).

At operation 804, the system may determine a location of the target object shown in each image. This operation may be similar to operation 704 of FIG. 7.

At operation 806, the system may determine a physical characteristic of the target object shown in the image that is common with other target objects. This operation may be similar to operation 706 of FIG. 7.

At operation 808, the system may determine a 3D position of the target object in a 3D representation of the portion of the physical topography based on the location (determined at operation 804) and the physical characteristic (determined at operation 806). As discussed earlier, the 3D representation may be the same as was created in phase one, described in reference to FIG. 7. In one embodiment, one or more units of an axis of the 3D representation may be mapped to a number of pixels that correspond to the physical characteristic of the target object (e.g., the pixel coordinates of two corners of a side of the target object). Based on this mapping, the system may determine the 3D position of the target object in the 3D representation. It should be understood that the system may determine a 3D position of each target object determined to be shown in each image of the plurality of images described at operation 802.

At operation 810, the system may determine that a vehicle associated with the target object is parked. In the case where the vehicle is an automobile with a vehicle license plate, the system may determine if the vehicle is parked using one of the methods described above in reference to FIG. 5 (e.g., determining whether a dwell time of a license plate in a particular 3D position matches a dwell time threshold, or receiving an indication that the vehicle has been checked in). In some embodiments, involving determining a zone boundary within a physical topography that is not a parking lot, operation 810 may be optional. In other embodiments, operation 810 may be replaced with another pattern of activity indicative of the target object being present in a particular zone of the physical topography.

At operation 812, based on determining that the vehicle is parked, the system may determine that the 3D position belongs to a cluster of 3D positions of one or more target objects. In this operation, continuing with the license plate example discussed above, the system may first utilize the determination that the vehicle is parked to filter out 3D positions of other license plates which are determined to not be associated with a parked vehicle. Once the system has determined one or more 3D positions of target objects shown in the plurality of images that should be utilized when generating the 3D boundary of a parking space, the system may then perform a clustering method. The clustering may proceed similar to as described in reference to FIG. 5, using any suitable clustering method.

At operation 814, the system may generate a 3D boundary of a zone of the one or more zones based on the 3D positions of the cluster, the zone corresponding to the 3D position of the target object. Using the license plate example, and as described in reference to FIG. 5, the system may utilize a center point of a determined cluster to generate a 3D boundary of the parking space. For example, in one embodiment, the system may construct a 3D boundary around the cluster center point by using the average expected dimensions of a vehicle in the real world, mapped onto the units of the 3D representation. In another embodiment, the 3D boundary may be determined by other aspects of the determined cluster. For example, the system may determine hotspots within a given cluster, each hotspot corresponding to a number of 3D positions of license plates that exceeds a threshold floor. The hotspot may also correspond with a confidence level of an aspect (e.g., dimension) of the 3D boundary. Using these hotspots, the system may filter out outliers and construct a 3D boundary that encompasses each of the hotspots within the 3D boundary.

Figure 9:
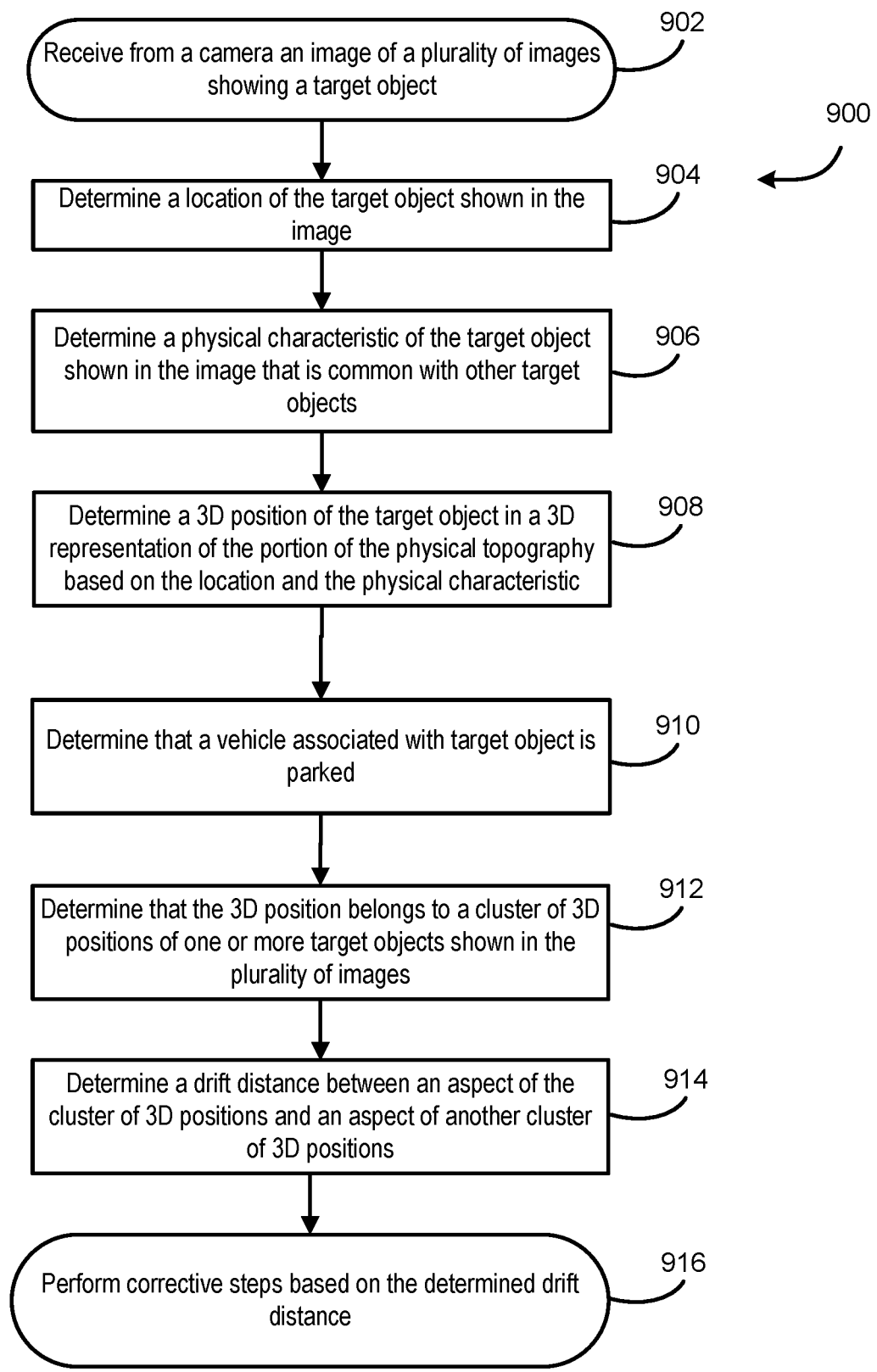
FIG. 9 illustrates an example flow for performing a function of the system of FIG. 6, according to an embodiment of the present disclosure.

FIG. 9 illustrates an example flow 900 for a computer system performing corrective steps upon detecting that a field of view of a trained camera (e.g. camera 602) has changed (e.g., camera drift). In some embodiments, the computer system may correspond to the service provider computer system 606 of FIG. 6. In some embodiments, the operations of FIG. 8 may be executed after the computer system has generated the 3D representation of the physical topography and/or a 3D boundary of a zone of the physical topography, respectively, according to the operations of FIG. 7 and/or FIG. 8. In describing the flow of FIG. 9, the license plate example described earlier will be used for illustration purposes only. It should be understood that the operations of this flow may be performed according to any suitable cadence. For example, the monitoring module 622 of the computer system 606 may be set to run continuously in a background application and perform flow 900 whenever a new image is received from the trained camera that shows a vehicle license plate (e.g., continuously updating the 3D representation and/or 3D boundaries of parking spaces). In other embodiments, the monitoring module 622 may be executed by the system upon receiving an indication that the accuracy rate of detecting vehicles parked in a parking space has dropped. For example, the system may receive check-in information from an external source (e.g., a pick-up site worker) and associate the check-in information with the accurate rate of the camera. Upon determining a discrepancy, the system may perform flow 900.

At operation 902, the system may receive from a camera an image of a plurality of images showing a target object. This operation may be similar to operation 802, except that here, the 3D boundary of a zone of the physical topography has already been created.

At operation 904, the system may determine a location of the target object shown in the image. This operation may be similar to operation 704 of FIG. 7.

At operation 906, the system may determine a physical characteristic of the target object shown in the image that is common with other target objects. This operation may be similar to operation 706 of FIG. 7.

At operation 908, the system may determine a 3D position of the target object in a 3D representation of the portion of the physical topography based on the location and the physical characteristic. This operation may be similar to operation 808 of FIG. 8.

At operation 910, the system may determine that a vehicle associated with the target object is parked. This operation may be similar to operation 810 of FIG. 8.

At operation 912, the system may determine that the 3D position belongs to a cluster of 3D positions of one or more target objects shown in the plurality of images. Unlike operation 812 of FIG. 8, in which case the system utilized another cluster of target objects to determine an initial 3D boundary of a parking space, here the system may utilize the cluster of 3D positions to determine if the camera field of view has drifted over time, and thus the 3D boundary may need to be updated. As discussed earlier, the system may compute if drift has occurred over time on any suitable time interval. In an example, the system may continuously receive a stream of images from the camera over time. For each new image that shows a target object, the system may re-compute a new cluster, and a corresponding center point for that cluster. The system may utilize a similar procedure as described in FIG. 5 and operation 812 of FIG. 8 to determine that the 3D position belongs to the cluster of 3D positions.

At operation 914, the system may determine a drift distance between an aspect of the cluster of 3D positions and an aspect of another cluster of 3D positions. In some embodiments, the system may maintain historical information about an aspect (e.g., the center point) of the previously determined cluster that was used to generate the initial 3D boundary of the parking space (e.g., at operation 812). The system may compare the center point of the previously determined cluster with an aspect (e.g., the center point) of the cluster determined at operation 912. For example, the system may determine a distance value between the two center points, the distance value corresponding to a tolerable range of drift of the camera's field of view. For example, the system may determine that slight movements of the camera are tolerable, and that the system is still able to detect the large majority of vehicles that are parked in a specific parking space. However, the system may determine that a drift distance value that falls within a certain drift range (e.g., greater than a predefined threshold value) leads to a drop in accurate detection of vehicles parked in the space.

At operation 916, the system may perform corrective steps based on the determined drift distance value of operation 914. In some embodiments, the corrective steps to be performed may depend on where within the drift range the drift distance value falls. For example, if the drift distance value is small, the system may determine to re-train the camera, for example, by re-executing flows 700 and 800 (e.g., of FIGS. 7 and 8). In some embodiments, the system may determine to only regenerate the boundary spaces within an existing 3D representation. However, in other embodiments, the drift distance value may be large enough such that the system determines to alert an administrator of the camera. This may happen, for example, when the camera's field of view is changed substantially (e.g., being bumped) such that retraining the camera would not improve accuracy. In alerting the camera administrator, the system may, in some embodiments, also disable the camera temporarily or perform any other suitable corrective steps.

Figure 10:
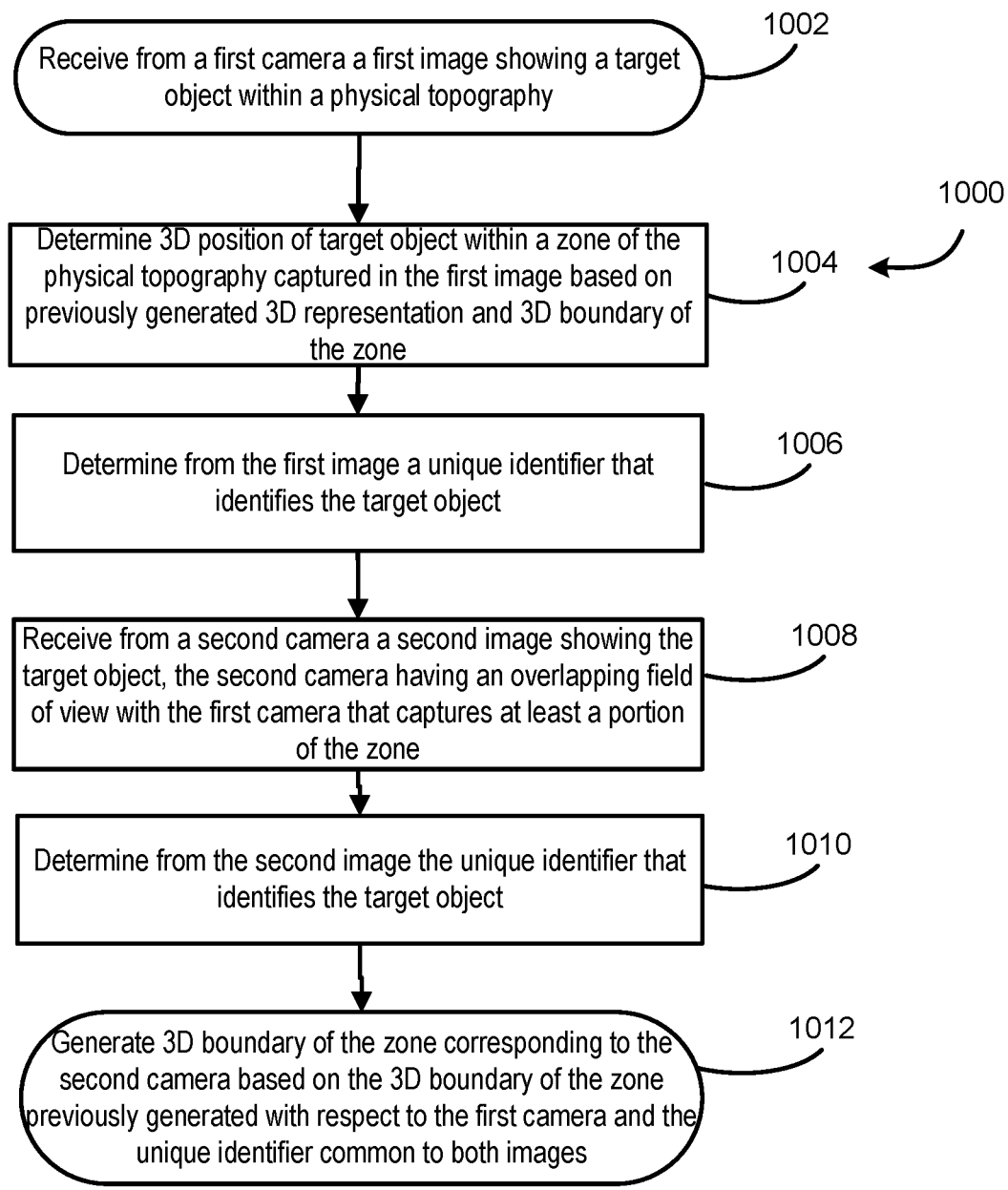
FIG. 10 illustrates an example flow for performing a function of the system of FIG. 6, according to an embodiment of the present disclosure.

FIG. 10 illustrates an example flow 1000 for a computer system training a new camera that has an overlapping field of view of a physical topography with a previously trained camera (e.g., camera 602). The system may already have trained the previously trained camera by generating a 3D representation and 3D boundary of at least one zone of the physical topography. The system may perform the training of the new camera based on a target object within the zone of the physical topography that is detected by both cameras (e.g., with an overlapping field of view). In some embodiments, the computer system may correspond to the service provider computer system 606 of FIG. 6.

At operation 1002, the system may receive from a first camera a first image showing a target object within a physical topography. In some embodiments, this operation may be similar to operation 902 of FIG. 9. In this case, the first camera may correspond to a previously trained camera according to the flows of FIGS. 7 and 8.

At operation 1004, the system may determine the 3D position of the target object within a zone of the physical topography captured in the first image based on the previously generated 3D representation and the 3D boundary of the zone. In some embodiments, determining the 3D position of the target object may be similar to operations 904-908 of FIG. 9. Once the 3D position is determined, the system may determine which parking space (e.g., which 3D boundary) the license plate may fall within.

At operation 1006, the system may determine from the first image a unique identifier that identifies the target object. In some embodiments, the unique identifier may be a labeling on the target object. In this case of a license plate, this lettering may correspond to an alphanumeric value, as described above.

At operation 1008, the system may receive from a second camera a second image showing the target object, the second camera having an overlapping field of view with the first camera that captures at least a portion of the zone. In an example, the second camera corresponds to an untrained camera, whereby the system has not performed the flows of FIGS. 7 and/or 8.

At operation 1010, the system may determine from the second image the unique identifier that identifies the target object. This operation may be similar to operation 1006. It should be understood that the system may be able to detect the unique identifier that identifies the target object even though a 3D representation and/or 3D boundary of the zone that encompasses the target object has not yet been determined by the system with respect to the field of view of the second camera.

At operation 1012, the system may generate a 3D boundary of the zone corresponding to the second camera based on the 3D boundary of the zone previously generated with respect to the first camera and the unique identifier common to both images. In some embodiments, by determining that the unique identifier of the target object is present in both images, the system may thereby determine that the fields of view of both the first camera and the second camera overlap. In some embodiments, the system may retrieve data related to the 3D boundary of the zone that was previously generated with respect to the first camera. For example, this data may include the human-friendly identifier of the zone in which the target object was detected. In some embodiments, the data may include coordinates of each of the corners of the 3D boundary, along with a scale for measuring units along the axes of the 3D representation of the first camera. In other embodiments, the data may include a center point of a cluster that was used to the 3D boundary with respect to the first camera. Any suitable information may be retrieved to be used as input when training the second camera. One or more components of the data may then be utilized by the system to generate a 3D boundary with respect to the same zone within the second camera's field of view.

Figure 11:
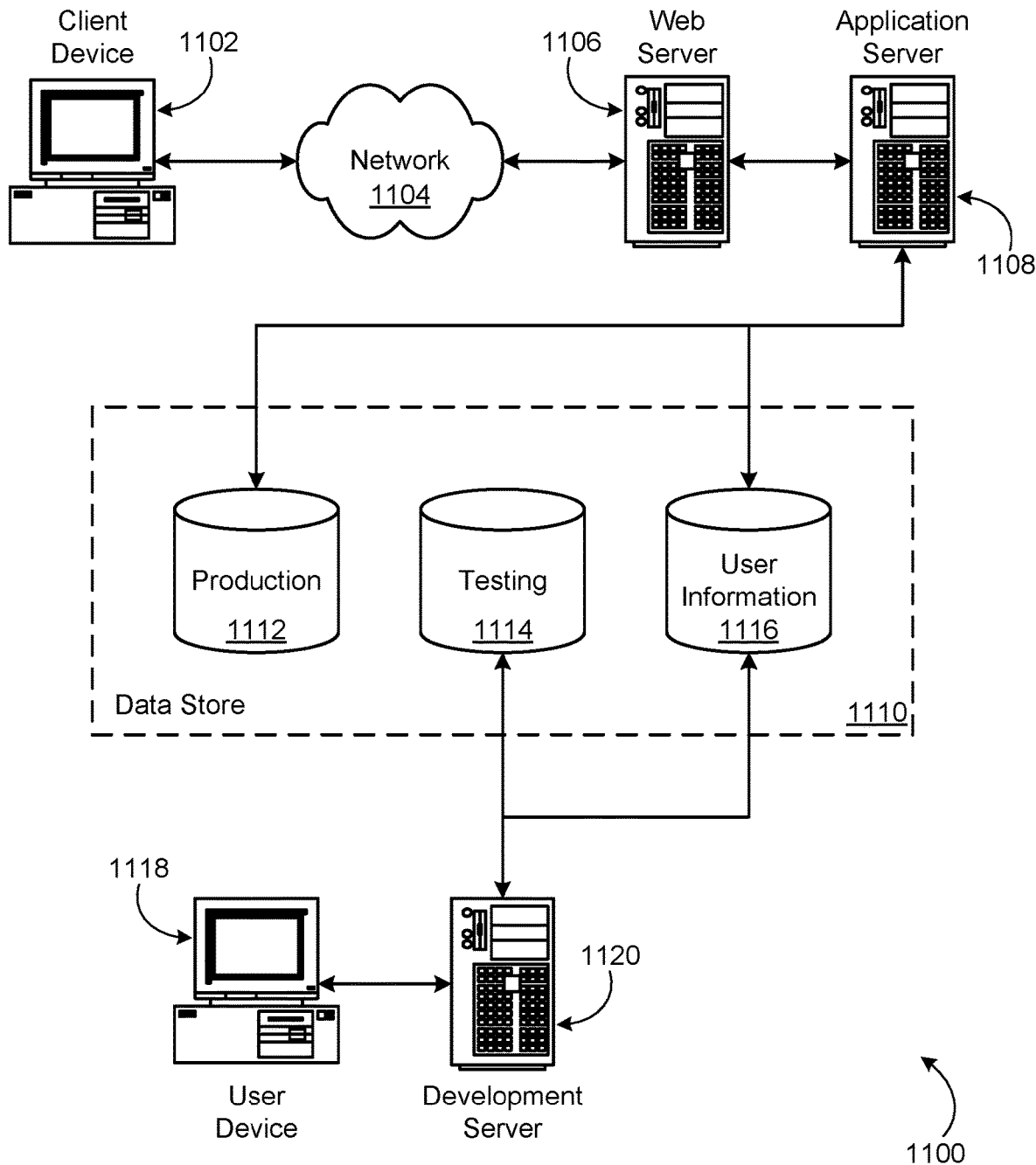
FIG. 11 is a schematic diagram illustrating an example environment for implementing aspects in accordance with at least one embodiment.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks, an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a camera; and
   a computer system communicatively coupled with the camera, the computer system comprising one or more processors and one or more computer-readable storage media storing instructions that, upon execution by the one or more processors, cause the computer system to, at least:
   receive, from the camera, a first image of a first plurality of images representing a motion of a first vehicle license plate through a portion of a parking lot, the portion being within a field of view of the camera;
   determine, based at least in part on the first image, a location of the first vehicle license plate shown in the first image;
   determine, based at least in part on the first image, a physical characteristic of the first vehicle license plate shown in the first image, the physical characteristic being common with a second vehicle license plate;
   generate a three-dimensional (3D) representation of the portion of the parking lot based at least in part on (i) the location and (ii) the physical characteristic;
   subsequent to generating the 3D representation of the portion of the parking lot, receive, from the camera, a second image of a second plurality of images, the second image showing the portion of the parking lot and the second vehicle license plate;
   determine a 3D position of the second vehicle license plate in the 3D representation based at least in part on (i) a second location of the second vehicle license plate shown in the second image, and (ii) the physical characteristic shown in the second image;
   determine that a vehicle is parked in the parking lot, the vehicle being associated with the second vehicle license plate;
   based in part on determining that the vehicle is parked, determine that the 3D position belongs to a cluster of 3D positions of one or more vehicle license plates shown in the second plurality of images; and
   generate a 3D boundary of a parking space within the portion of the parking lot based at least in part on the 3D positions of the cluster, the parking space corresponding to where the vehicle is parked.

2. The system of claim 1, wherein the motion of the first vehicle license plate corresponds to a movement in a two-dimensional (2D) plane that is substantially parallel to a ground of the parking lot.

3. The system of claim 1, wherein the physical characteristic comprises a first vehicle license plate corner of the first vehicle license plate being at a fixed relative distance from a second vehicle license plate corner.

4. The system of claim 1, wherein the second image of the second plurality of images is associated with a timestamp, the timestamp being used to determine that the vehicle is parked.

5. The system of claim 1, further comprising:
   a second camera, wherein the camera and the second camera have overlapping fields of view; and
   the one or more computer-readable storage media storing further instructions that, when executed by the one or more processors, further cause the computer system to:
   receive, from the camera, a third image showing a third vehicle license plate of another vehicle;
   determine, from the third image, a unique identifier that identifies the third vehicle license plate;
   determine, from the third image, a second 3D position of the third vehicle license plate in the 3D representation based at least in part on (i) a third location of the third vehicle license plate shown in the third image, and (ii) the physical characteristic shown in the third image;
   determine that the another vehicle is parked in the parking space, based at least in part on (i) the second 3D position, and (ii) the 3D boundary of the parking space;
   receive, from the second camera, a fourth image, the fourth image showing a second portion of the parking lot that is within a field of view of the second camera;
   determine, from the fourth image, the unique identifier that identifies the third vehicle license plate; and
   generate a second 3D boundary of the parking space corresponding to the second camera based at least in part on the 3D boundary of the parking space corresponding to the camera.

6. A method implemented on a computer system, the method comprising:
   receiving, from a camera, an image showing a portion of a parking lot and a vehicle license plate;
   determining, based at least in part on the image, a location of the vehicle license plate shown in the image;
   determining, based at least in part on the image, a physical characteristic of the vehicle license plate shown in the image, the physical characteristic being common with at least another vehicle license plate;
   determining a three dimensional (3D) position of the vehicle license plate in a 3D representation of the portion of the parking lot, the 3D position determined based at least in part on (i) the location of the vehicle license plate, and (ii) the physical characteristic;
   determining that the 3D position belongs to a cluster of 3D positions of one or more vehicle license plates; and
   generating a 3D boundary of a parking space for a vehicle within the portion of the parking lot based at least in part on the 3D positions of the cluster.

7. The method of claim 6, further comprising:
   determining that the vehicle is parked in the parking lot, and wherein the 3D position is determined to belong to the cluster of 3D positions further based at least in part on the vehicle being parked.

8. The method of claim 7, further comprising determining that the vehicle is parked in the parking lot by at least:
receiving an indication that the vehicle is checked-in, wherein the vehicle being checked-in corresponds to a state in which the vehicle is ready for receiving a delivery; and
based on receiving the indication, determining that the vehicle is parked.

9. The method of claim 7, further comprising determining that the vehicle is parked in the parking lot by at least:
receiving as input a dwell time threshold;
determining a first timestamp associated with the image;
receiving, from the camera, a second image being associated with a second timestamp, the second image showing the portion of the parking lot and the vehicle license plate;
determining that the vehicle license plate is shown in the second image;
determining a second 3D position of the vehicle license plate in the 3D representation based at least in part on (i) a second location of the vehicle license plate shown in the second image, and (ii) the physical characteristic of the vehicle license plate shown in the second image; and
based at least in part on (i) a difference between the 3D position and the second 3D position, and (ii) a difference between the first timestamp and the second timestamp matching the dwell time threshold, determining that the vehicle is parked in the parking lot.

10. The method of claim 6, further comprising determining the 3D representation by at least:
receiving, from the camera, a second image of a plurality of images representing a motion of a second vehicle license plate through the portion of the parking lot;
determining, based at least in part on the second image, a location of the second vehicle license plate shown in the second image;
determining, based at least in part on the second image, the physical characteristic of the second vehicle license plate shown in the second image that is common with the vehicle license plate; and
generating the 3D representation of the portion of the parking lot based at least in part on (i) the location and (ii) the physical characteristic.

11. The method of claim 10, wherein determining the 3D representation further comprises:
receiving a third image of the plurality of images;
determining, based at least in part on the third image, a second location of the second vehicle license plate shown in the second image;
determining, based at least in part on the physical characteristic and utilizing a transformation model, a relative distance between the location and the second location.

12. The method of claim 10, wherein the 3D representation of the portion of the parking lot is generated independently of an orientation of the camera.

13. The method of claim 6, wherein the 3D boundary of the parking space corresponds to a cuboid, and wherein the cuboid is formed by a plurality of 3D coordinates of the 3D representation of the portion of the parking lot.

14. The method of claim 6, wherein determining that the 3D position of the vehicle license plate belongs to the cluster of 3D positions comprises:
determining a distance value corresponding to a distance between an aspect of the 3D position and an aspect of the cluster of 3D positions; and
determining the 3D position of the vehicle license plate belongs to the cluster of 3D positions based at least in part on the distance value, wherein a number of positions of the cluster of 3D positions corresponds to a confidence level of the 3D boundary.

15. The method of claim 6, further comprising:
receiving, from the camera, a second image showing the portion of the parking lot and a second vehicle license plate;
determining, based at least in part on the second image, a location of the second vehicle license plate shown in the image;
determining, based at least in part on the second image, a physical characteristic of the second vehicle license plate shown in the image, the physical characteristic being common with the at least another vehicle license plate;
determining a second 3D position of the second vehicle license plate in the 3D representation of the portion of the parking lot, the second 3D position determined based at least in part on (i) the location of the second vehicle license plate, and (ii) the physical characteristic; and
determining that a second vehicle is parked in the parking space based at least in part on (i) the second 3D position of the second vehicle license plate, and (ii) the 3D boundary.

16. The method of claim 6, further comprising:
subsequent to generating the 3D boundary of the parking space, receiving, from the camera, a second image showing a different portion of the parking lot;
receiving an indication that a second vehicle is parked in the parking space, the indication based on an input that is independent of the second image; and
based at least in part on determining that a second vehicle license plate associated with the second vehicle is not detected within the second image, transmitting a message to an administrator device that a field of view of the camera has been changed from the portion of the parking lot to the different portion.

17. A non-transitory computer-readable storage medium storing instructions that, upon execution on a computer system, configure the computer system to perform operations comprising:
receiving, from a camera, an image showing a portion of a physical topography and a target object, the physical topography being divided into a plurality of zones;
determining, based at least in part on the image, a location of the target object shown in the image;
determining, based at least in part on the image, a physical characteristic of the target object shown in the image, the physical characteristic being common with at least another target object;
determining a three dimensional (3D) position of the target object in a 3D representation of the portion of the physical topography, the 3D position determined based at least in part on (i) the location of the target object, and (iii) the physical characteristic;
determining that the 3D position belongs to a cluster of 3D positions of one or more target objects; and
generating a 3D boundary of a zone of the plurality of zones of the portion of the physical topography based at least in part on the 3D positions of the cluster, the zone corresponding to the 3D position of the target object.

18. The non-transitory computer-readable storage medium of claim 17, wherein the target object corresponds to a vehicle license plate that is associated with a vehicle, the physical topography corresponds to a parking lot, and the zone corresponds to a parking space of the parking lot.

19. The non-transitory computer-readable storage medium of claim 17, wherein the operations further comprise:
   receiving, from the camera, a second image of a second plurality of images representing a motion of a second target object through the portion of the physical topography;
   determining, based at least in part on the second image, a location of the second target object shown in the second image;
   determining, based at least in part on the second image, the physical characteristic of the second target object shown in the second image that is common with the target object; and
   generating the 3D representation of the portion of the physical topography based at least in part on (i) the location and (ii) the physical characteristic.

20. The non-transitory computer-readable storage medium of claim 17, wherein the operations further comprise:
   receiving, from the camera, a second image showing a second target object;
   determining, based at least in part on the second image, a location of the second target object shown in the image;
   determining, based at least in part on the second image, a physical characteristic of the second target object shown in the image, the physical characteristic being common with the at least another target object;
   determining a second 3D position of the second target object in the 3D representation of the portion of the physical topography, the second 3D position determined based at least in part on (i) the location of the second target object, and (ii) the physical characteristic; and
   determining that the second 3D position of the second target object belongs to a second cluster of 3D positions of one or more target objects;
   determining a distance value corresponding to a distance between an aspect of the cluster of 3D positions and an aspect of the second cluster of 3D positions; and
   determining that the distance value falls within a drift range of the camera, wherein generating the 3D boundary of the zone is performed based at least in part on the distance value falling within the drift range.

* * * * *